United States Patent
Bosley

[11] Patent Number: 5,427,455
[45] Date of Patent: Jun. 27, 1995

[54] COMPLIANT FOIL HYDRODYNAMIC FLUID FILM RADIAL BEARING

[76] Inventor: Robert W. Bosley, 18104 Hoffman Ave., Cerritos, Calif. 90701

[21] Appl. No.: 229,205

[22] Filed: Apr. 18, 1994

[51] Int. Cl.⁶ .............................................. F16C 32/06
[52] U.S. Cl. ................................. 384/106; 384/103; 384/104
[58] Field of Search ............... 384/106, 105, 104, 103, 384/215

[56] References Cited

U.S. PATENT DOCUMENTS

| | | | |
|---|---|---|---|
| 3,366,427 | 1/1968 | Silver et al. | |
| 3,434,761 | 3/1969 | Marley | 384/103 |
| 3,467,451 | 9/1969 | Marley | 384/215 |
| 3,635,534 | 1/1972 | Barnett | 384/106 |
| 3,795,427 | 3/1974 | Licht et al. | |
| 3,809,443 | 5/1974 | Cherubium | |
| 3,957,317 | 5/1976 | Silver | 384/103 |
| 4,170,389 | 10/1979 | Eshel | 384/104 |
| 4,178,046 | 12/1979 | Silver et al. | |
| 4,213,657 | 7/1980 | Gray | 384/105 |
| 4,223,958 | 9/1980 | Gray | |
| 4,229,054 | 10/1980 | Miller, Jr. | |
| 4,262,975 | 4/1981 | Heshmat et al. | |
| 4,277,113 | 7/1981 | Heshmat | |
| 4,415,281 | 11/1983 | Agrawal | 384/103 |
| 4,526,483 | 7/1985 | Hishikawa et al. | 384/106 |
| 4,552,466 | 11/1985 | Warren | 384/103 |
| 4,597,677 | 7/1986 | Hagiwara | 384/106 X |
| 4,743,126 | 5/1988 | Soum et al. | 384/105 |
| 4,961,122 | 10/1990 | Sakai et al. | 384/114 X |
| 5,116,143 | 5/1992 | Saville | 384/106 |
| 5,129,739 | 7/1992 | Asai et al. | 384/292 |
| 5,228,785 | 7/1993 | Saville et al. | 384/103 |

FOREIGN PATENT DOCUMENTS

| | | | |
|---|---|---|---|
| 101316 | 6/1985 | Japan | 384/103 |

*Primary Examiner*—Thomas R. Hannon
*Attorney, Agent, or Firm*—Cislo & Thomas

[57] ABSTRACT

A compliant foil hydrodynamic fluid film radial bearing is disclosed which is comprised of a cylindrical rotor, fluid foil(s), spring foil(s), and a foil retaining cartridge. The cartridge has circumferentially undulating cam shaped lobes or has circumferential ramps and joggles that induce the spring and fluid foils to form converging fluid-dynamic wedge channels which compress and pressurize the process fluid and diverging channels which draw in makeup fluid. A spring foil is formed as a thin, flat sheet having chemically etched slots of a pattern that causes cantilever beams to stand erect and function as springs when the foil is bent to install in the cartridge. When a single foil is used in lieu of a plurality of foils made up of segments, that foil is preloaded away from the rotor by bending stresses in the foil that are induced when the foil is bent to fit into the cartridge. Additional forces to preload the foils away from the rotor can be applied to the ends of the foils by a circumferential preload bar in the aperture of the cartridge. This combination of preloading techniques results in low starting torque, low lift off speed and small sway space. The fluid foil, when used with the cam shaped cartridge, is vented in the area of the diverging channels to admit the working fluid, and has V-shaped grooves chemically etched into the outer surface of the foil near each end to tailor the foil's bending stiffness.

40 Claims, 16 Drawing Sheets

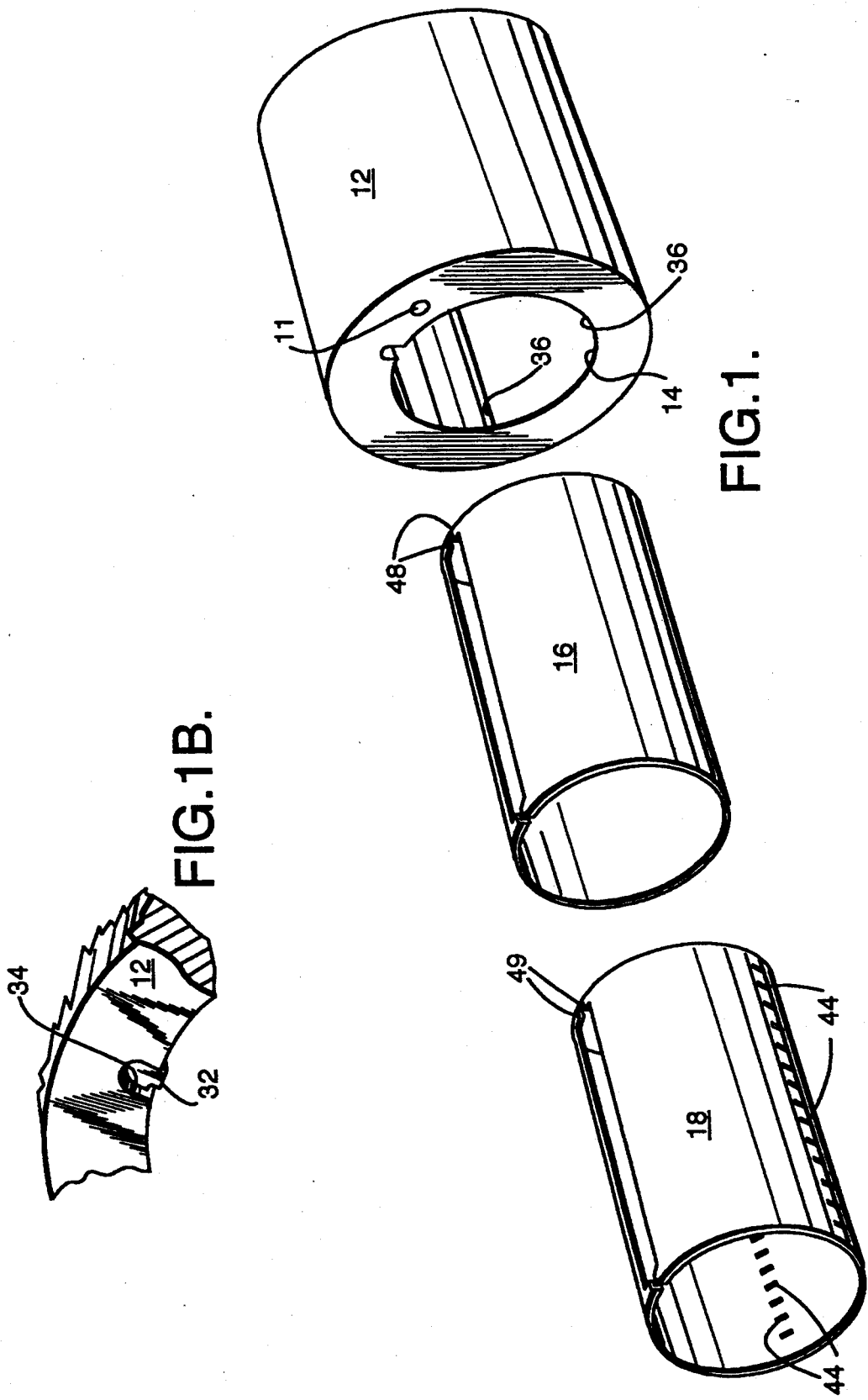

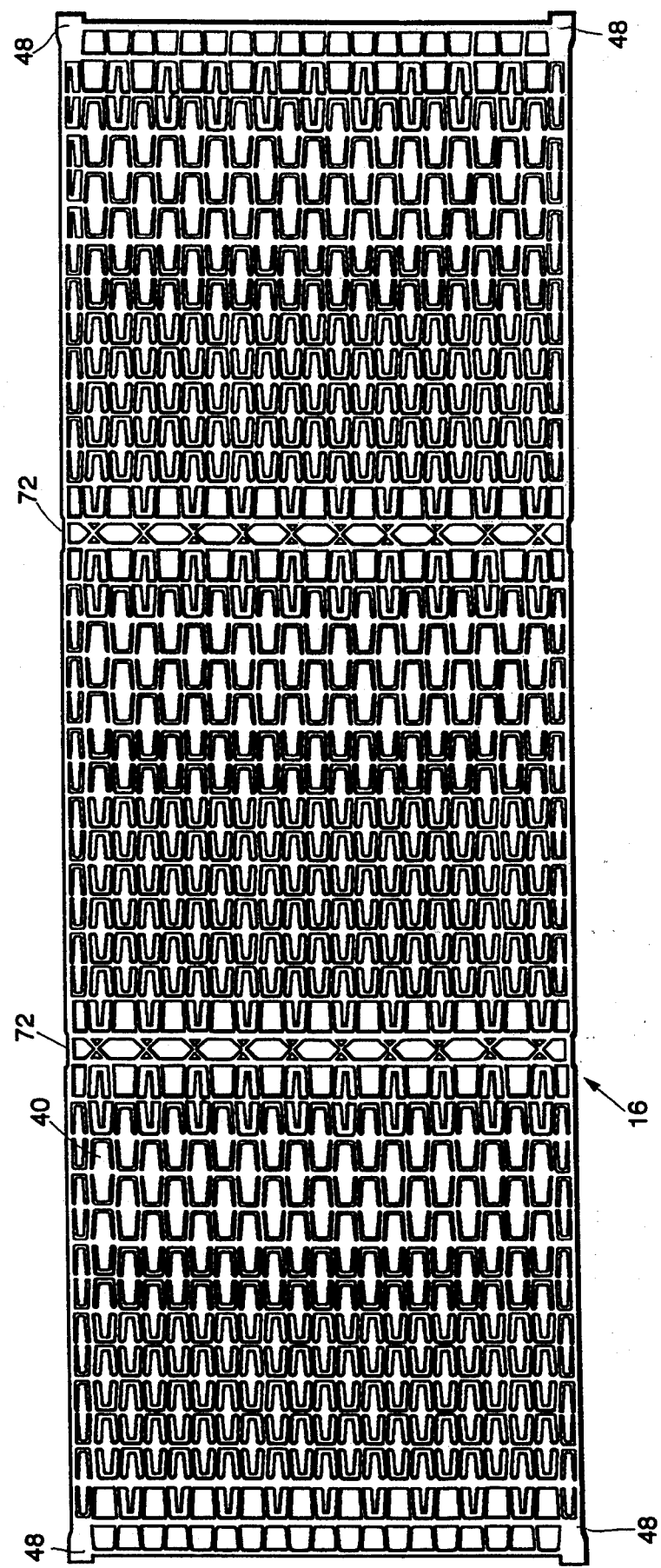

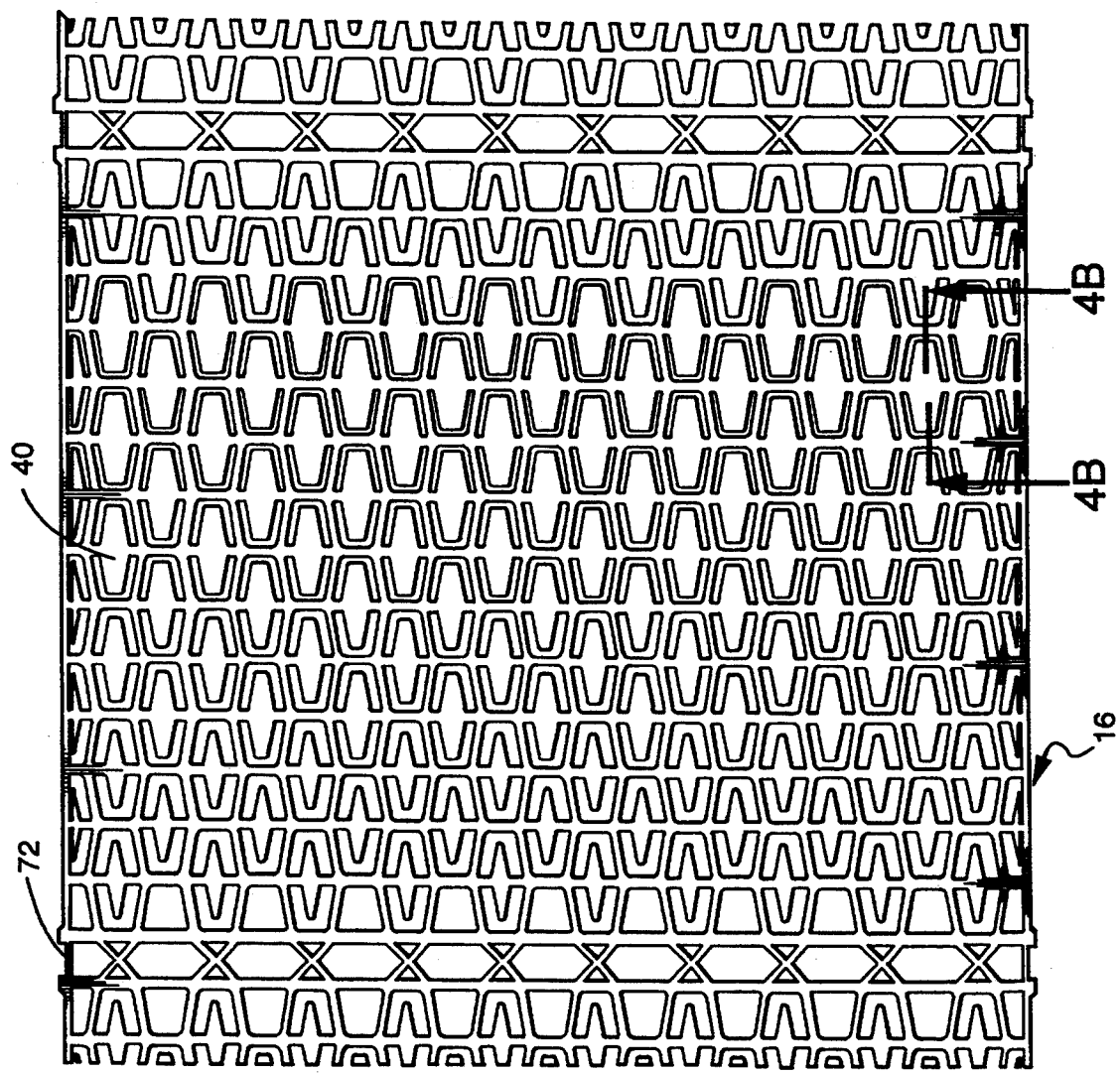

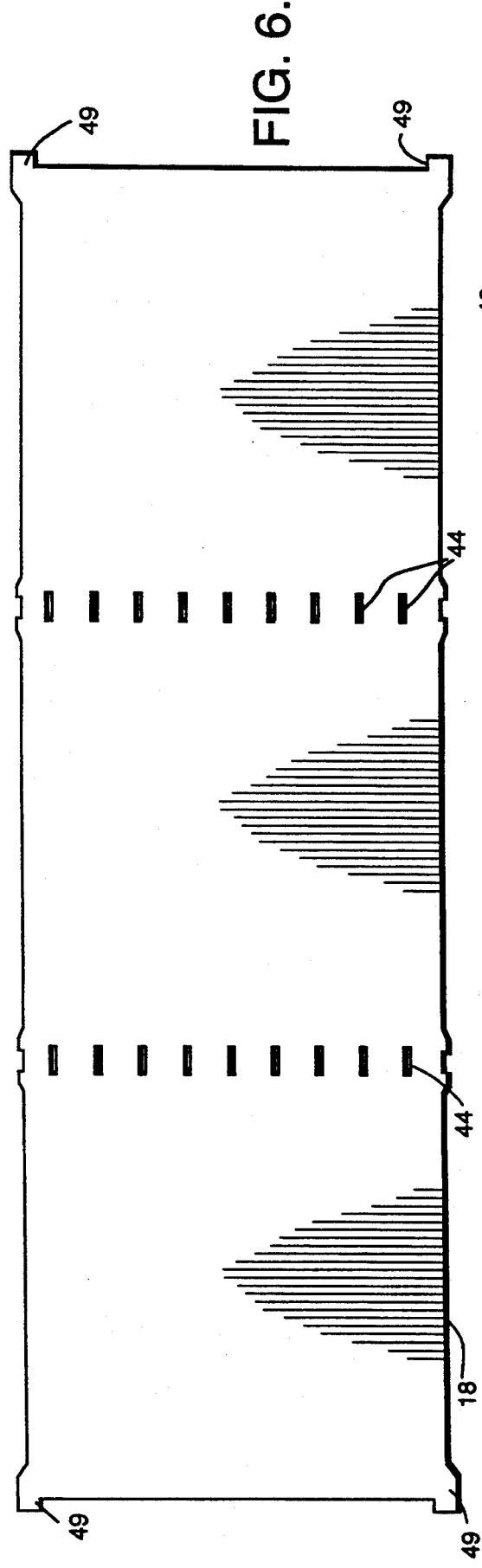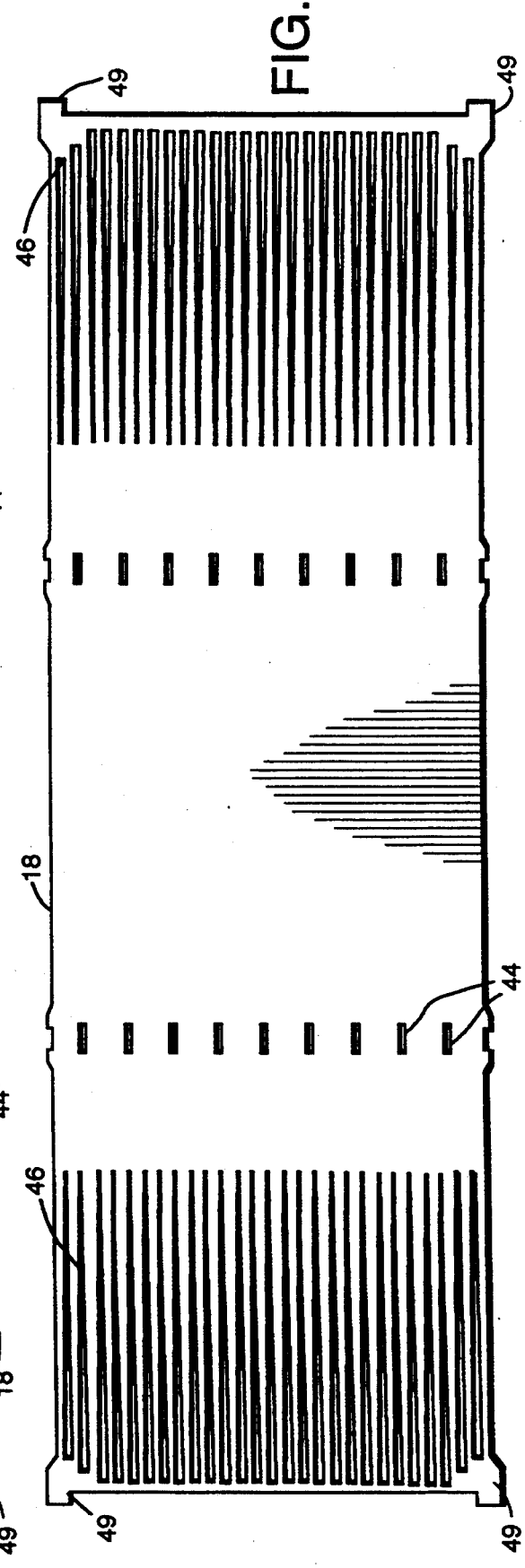

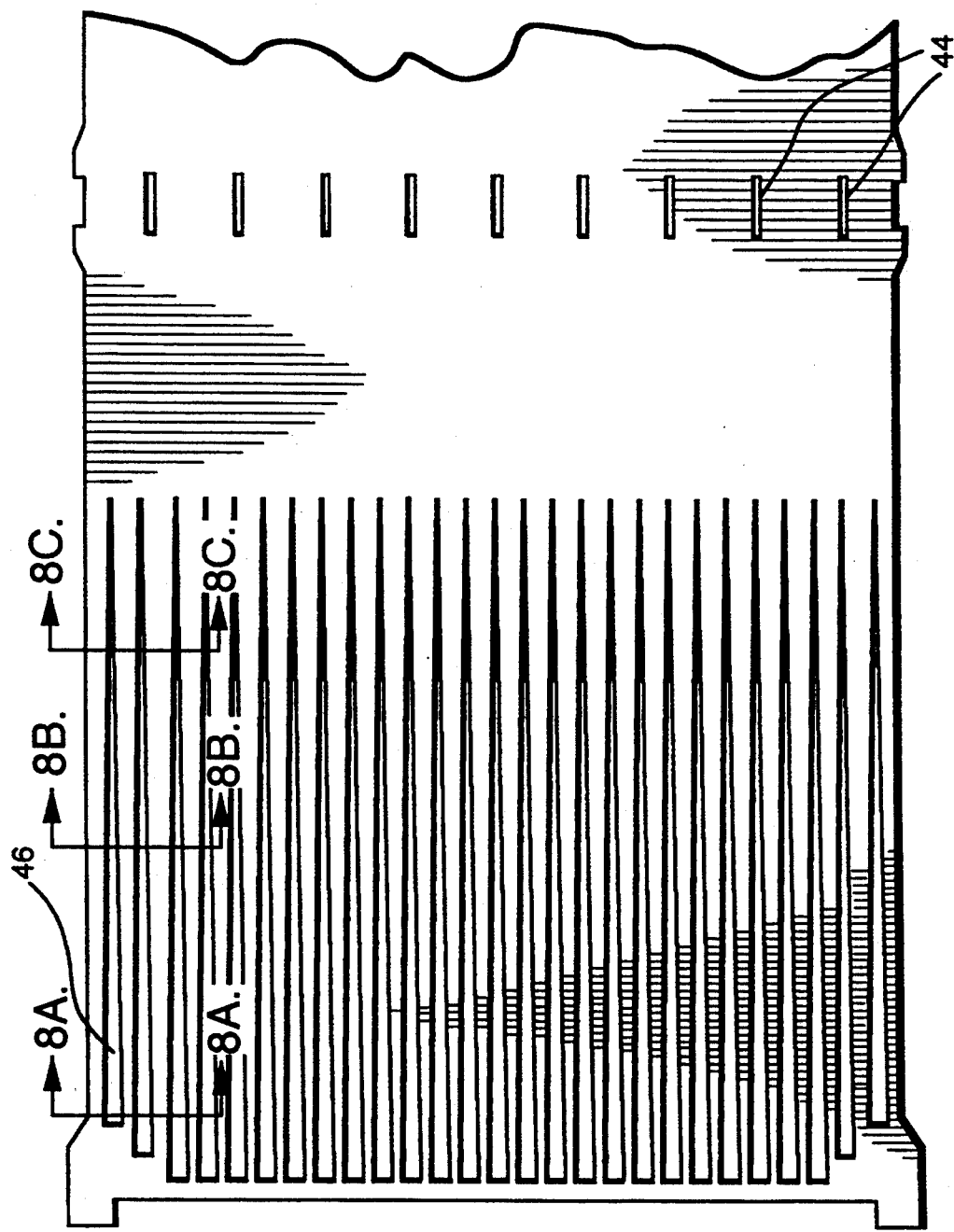

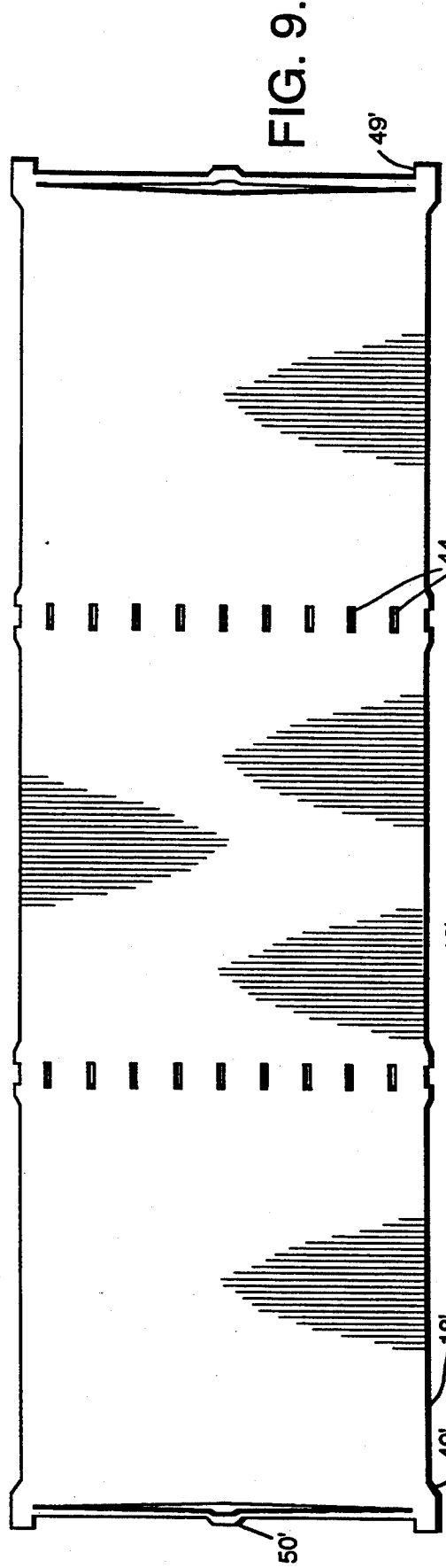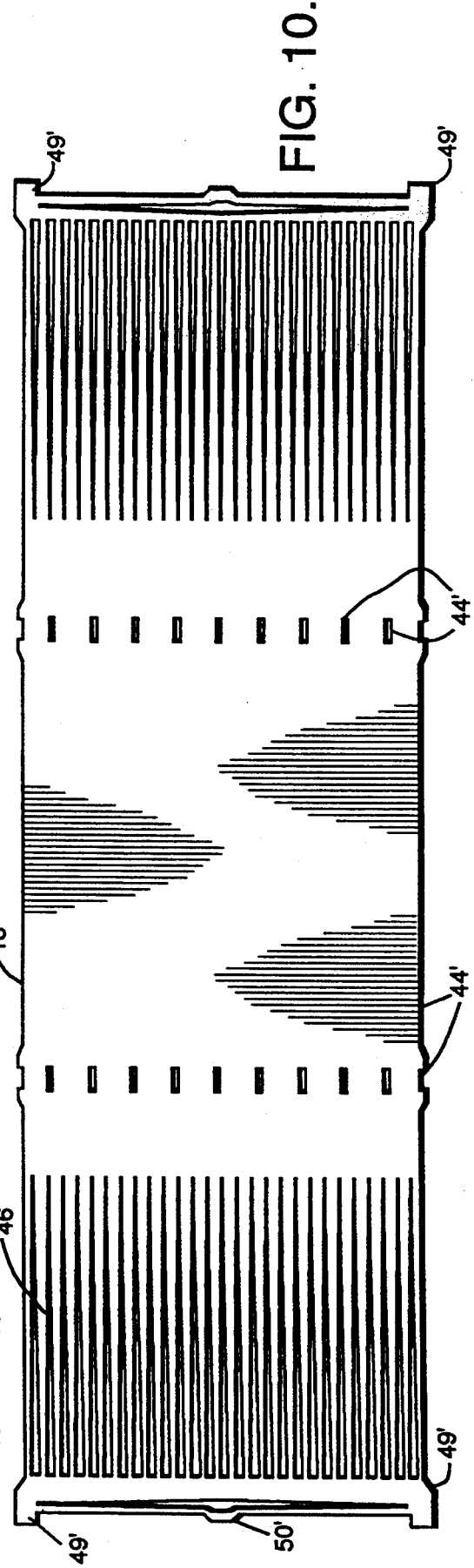

COMPLIANT FOIL HYDRODYNAMIC FLUID FILM RADIAL BEARING

TECHNICAL FIELD

This invention relates to the general field of compliant foil hydrodynamic fluid film bearings and more particularly to an improved bearing employing one or more fluid foils and one or more underlying spring foils to support, position, damp and accommodate movement or excursions of the rotating portion of the bearing.

BACKGROUND OF THE INVENTION

Compliant foil hydrodynamic fluid film radial bearings are currently being utilized in a variety of high speed rotor applications. These bearings are comprised of an inner rotating element, non-rotating compliant fluid foil elements that surround the rotating element, non-rotating compliant spring foil elements that surround the fluid foil element and a non-rotating cartridge element that surrounds and provides attachments for the foil elements. The annular space between the rotating element and the cartridge element is filled with fluid (usually air) which envelops the foils. The space between the smooth rotating element and the fluid foil is subdivided into a plurality of fluid-dynamic wedge channels. These wedge channels are formed by overlapping the fluid and spring foils to form ramps in the inner surfaces of the fluid foils. The fluid wedge channels converge in thickness in the direction of the rotating element's motion. The rotating element's motion applies viscous drag forces to the fluid in the converging wedge channels. This results in increases in fluid pressure, especially near the trailing end of the wedge channels. If the rotating element moves toward the non-rotating element, the wedge channel's convergence angle increases causing the fluid pressure along the wedge channel to increase. If the rotating element moves away, the pressure rise along the wedge channel decreases. Thus, the fluid in the wedge channels exerts restoring forces on the rotating element that vary with and stabilize running clearances and prevent contact between the rotating and non-rotating elements of the bearing. Flexing and sliding of the foils causes coulomb damping of any orbital motion of the rotating element of the bearing.

At low rotor speeds, the rotating element of the bearing is in physical contact with the fluid foil element(s) of the bearing, resulting in bearing wear. Only when the rotor speed is above what is termed the lift-off/touch-down speed do the fluid dynamic forces generated in the wedge channels assure a running gap between the rotating and non-rotating elements.

Conventional, compliant foil hydrodynamic fluid film bearings have relied on backing springs and the spring properties of the elastically bent fluid foil to preload the fluid foil against the relatively moveable rotating element (rotor) to control foil nesting/position and to establish foil dynamic stability. This preload force significantly reduces the rotor speed at which the wedge channel effect is strong enough to lift the rotating bearing element out of physical contact with the non-rotating elements of the bearing. This preload force and the high lift-off/touch-down speed result in significant bearing wear each time the rotor is started or stopped. These bearings usually have high starting torques.

Conventional, compliant foil hydrodynamic fluid film bearings achieve spring properties for their spring foils before assembly into the bearing cartridge by imparting a permanently deformed series of, for example, convoluted spring portions. Therefore, the foil pack is relatively thick and has fairly large tolerances for foil stack height. The maximum rotor deflections that these bearings permit is fairly large (loose compliance control).

Most conventional compliant foil hydrodynamic fluid film bearings use a plurality of fluid foils and a plurality of spring foils. This results in reduced load capacity and higher bearing costs when compared to bearings with a single spring foil and a single fluid foil.

If a single fluid foil were to be used in lieu of a plurality of fluid foils, and that foil were formed as a flat, constant thickness sheet, which is subsequently formed to fit into the cartridge, the foil would not follow the contours of the inside of the cartridge near the foil ends. This is due to the fact that no bending moment can be applied to the ends of the foil and the foil's bending stiffness is constant throughout its length.

If a single fluid foil is utilized and it is attached to the cartridge at one end, the rotor can only rotate in one direction without risking foil to rotor lock-up and foil failure due to ever increasing rotor to foil friction and foil tension.

Previously, many types of compliant foil hydrodynamic fluid film radial bearings have been used to support, position and control the resonant motion of high speed rotating assemblies. These bearings have utilized cartridges with round apertures. Most bearings have used from five to nine fluid foils and from five to nine spring foils arrayed around the inside of the cartridge aperture. Many of the conventional, prior art bearings have the fluid foil welded to the spring foil, or when using a plurality of foils, attach the foils to the cartridge by bending the foils around bars or welding them to bars and then inserting the bars into wide slots provided for foil retention in the cartridge aperture.

A search of the prior-art has not disclosed any directly pertinent patents to the instant invention. Specifically, no art has been found that utilizes: 1) contoured cartridge apertures, 2) flat-formed spring foils with cantilever beams which stand erect when the foil is bent or formed for insertion into the cartridge, and 3) circumferential preloading of foils to force the foils to press against the cartridge aperture. However, the following U.S. patents are considered related:

| U.S. PAT. NO. | INVENTOR | DATE ISSUED |
| --- | --- | --- |
| 3,366,427 | Silver | Jan. 30, 1968 |
| 3,795,427 | Licht | Mar. 05, 1974 |
| 3,809,443 | Cherubim | May 07, 1974 |
| 3,957,317 | Silver | May 18, 1976 |
| 4,170,389 | Eshel | Oct. 09, 1979 |
| 4,178,046 | Silver | Dec. 11, 1979 |
| 4,213,657 | Gray | July 22, 1980 |
| 4,223,958 | Gray | Sep. 23, 1980 |
| 4,229,054 | Miller | Oct. 21, 1980 |
| 4,262,975 | Heshmat | Apr. 21, 1981 |
| 4,277,113 | Heshmat | July 07, 1981 |
| 4,415,281 | Agrawal | Nov. 15, 1983 |
| 4,552,466 | Warren | Nov. 12, 1985 |
| 4,743,126 | Soum | May 10, 1988 |
| 4,961,122 | Sakai | Oct. 02, 1990 |
| 5,129,739 | Asai | July 14, 1992 |

| U.S. PAT. NO. | INVENTOR | DATE ISSUED |
|---|---|---|
| 5,228,785 | Saville | July 20, 1993 |

Silver (U.S. Pat. No. 3,366,427) discloses a bead 22, wide slots 18 and 19, rod 23 as elements for attaching foils to the cartridge while in the instant disclosure the foils are retained by pressing against the circumferential preload bar or are slid into electro discharge machined EDM fabricated slots. Silver also discloses ramps which are achieved by overlapping a plurality of foils, while in the instant invention there is no overlapping of foils and the lobes or ramps are achieved by contouring the cartridge aperture.

Licht (U.S. Pat. No. 3,795,427) discloses an overlapping single foil 61 or a plurality of overlapping foils 63, 64, and 65 which are secured to the cartridge by a retaining tab 78 at the end of the cartridge. In the instant invention, non-overlapping foils are secured by the circumferential preload bar along a line parallel to the cartridge axis.

Cherubim (U.S. Pat. No. 3,809,443) discloses a single spring foil element 23 and a single fluid foil element 25. But these foils are bonded together at one end, while in the instant invention the spring and fluid foils are not bonded. Cherubim discloses a spring foil that is formed into resilient surface elevations 27, while in the instant invention the spring foil is formed flat. Cherubim discloses a suitable restraining means (pin) 95 to secure the spring and fluid foils to the cartridge without circumferential preloading the foils, while in the instant invention a circumferential preload bar is used to preload the foils.

Silver (U.S. Pat. No. 3,957,317) discloses overlapping foils having herringbone or chevron shaped trailing edges that are attached to the cartridge by bars set in wide milled slots. These foils are preformed with radii that are greater than that of the round cartridge aperture. The intentional mismatch of the foil/cartridge radii causes the plurality of foils to be preloaded against the rotor. In the instant invention, the single fluid foil and single spring foil are preloaded away from the rotor and towards the contoured cartridge aperture.

Eshel (U.S. Pat. No. 4,710,389) discloses a ribbon-shaped thin steel foil member 41 which is stretched over a body of pressurized material which functions as a support media for fluid foils. He does not disclose a spring foil as a support for a fluid foil.

Silver (U.S. Pat. No. 4,178,046) discloses foils attached to the cartridge by mounting bars 14 and 44 and supported by springs with milled or chemically etched ridges 54 and grooves 56. In the instant invention, no bars are bonded to the foil or inserted into cartridge grooves nor are the spring foils formed to make ridges or grooves.

Gray (U.S. Pat. No. 4,213,657) discloses a spring comprised of tubular elements 22 and cage elements 24, while in the instant invention flat formed spring foils are utilized.

Gray (U.S. Pat. No. 4,223,958) discloses a spring foil having raised projections 42 fabricated in previously flat metal by the application of deforming forces. These projections function as cantilever beams. But in the instant invention, the cantilever beams are created in flat metal by chemical etch techniques, then they "stand proud" and function as springs only when the foil is bent or formed for insertion into the cartridge.

Miller (U.S. Pat. No. 4,229,054) discloses spacer blocks 25, the ends 23 of which are attached to the bore wall of the sleeve 15 by welding or other suitable means to prevent rotation of the bearing modules 13 relative to the sleeve 15. This welding or other suitable means presumably would also function to prevent axial translation of the bearing foil modules out of the sleeve. The bearing foil modules are also shown to reside in and be captured by the walls of a circumferential channel in the sleeve, presumable to also provide constraint against the bearing foil modules translating axially out of the sleeve. Miller does not disclose any element functioning as a circumferential preload bar, nor does he disclose any element functioning as anti-translation tabs or anti-translation grooves. Miller discloses a bi-directional journal bearing utilizing three bearing foil modules, each being 120 degrees long in arc length. But he does not identify any means to generate the circumferentially compressive stresses within the foils, between the foil attachment points to the sleeve and any foil to rotor contact points which would be required for bi-directional operation of single fluid foil bearings without tightening the fluid foil about the rotor to the point of foil failure. Miller does not utilize a contoured cartridge aperture, flat formed spring foils, or spring foil spring rates that vary along the arced length of the foil.

Heshmat (U.S. Pat. No. 4,262,975) discloses a compliant support element 54 which has a spring rate that varies along the length of the element due to variations in the spacing of ridges or bumps 56 in the element. In the instant invention, the spring rates vary due to variations in cantilever beam width and length, not variations in spacing of ridges or bumps. Heshmat also discloses a bearing pad assembly 40 which creates a ramped thickness change in the fluid foil. In the instant invention, there is a foil thickness variation, but it is in the spring foil, not the fluid foil, and it is achieved by varying the length of the cantilever beams.

Heshmat (U.S. Pat. No. 4,277,113) discloses a spring foil with elevation 52 that has a non-linear spring rate that increase with deflection. But in the instant invention, the non-linear spring rate is accomplished by wrapping the cantilever beam around the rotor radius so as to change the free length of the cantilever beam. This is a totally different means of achieving a non-linear spring than that utilized by Heshmat.

Agrawal (U.S. Pat. No. 4,415,281) discloses a convoluted spring foil 45 that has a non-linear spring rate that varies with deflection. This is accomplished by forming the foil in a plurality of sinusoidal shapes of varying height and spacing. Again, this method is different than in the instant invention.

Warren (U.S. Pat. No. 4,552,466) discloses foils with tabs 24 used for attachment to the cartridge. None of the disclosed tab configurations or attachment methods utilize electro discharge machine (EDM) technology.

Soum (U.S. Pat. No. 4,743,126) discloses a foil having side margins 3 that attach the foil to the end of the cartridge. In the instant invention, the foils are restrained against rotation in the cartridge by tabs oriented 90 degrees relative to those disclosed by Soum.

Sakai (U.S. Pat. No. 4,961,122) discloses a herringbone grooved bearing (the invention) and V-grooved bearings (the prior art) wherein the bearing has either grooves 160 or raised portions 260 in the shaft 4 and similar groove or raised portion patterns in the inner bore of the bearing housing 6 to induce local increases in the process fluid pressure when the shaft is rotated and displaced radially away from the centerline of the housing. The V grooves in the rotor and housing disclosed by Sakai are unrelated to the variable width V-shaped grooves used in the outer surface of the fluid foil of the instant invention.

Asai (U.S. Pat. No. 5,129,739) discloses a bearing with dynamic pressure grooves formed in the thermoplastic resin inner surface of a rigid metal cylinder 21 which functions as a fluid dynamic surface. This cylinder is not resiliently mounted to the bearing housing. In the fourth embodiment of the instant invention, the fluid sleeve does not have pressure grooves in its inner surface, is thin and flexible, and is resiliently mounted to the bearing cartridge aperture.

Saville (U.S. Pat. No. 5,228,785) discloses overlapping foils supported by convoluted spring foils having variable convolute height and variable convolute spacing to achieve non linear spring rates and ramps. In the instant invention, non-linear spring rates are achieved with variable cantilever beam width and length, and ramps are achieved by contouring the cartridge aperture and with variable cantilever beam length.

SUMMARY AND OBJECTS OF THE INVENTION

The combination of the single fluid foil, the single spring foil, the cam shaped cartridge, the precisely tailored spring rates of the flat formed spring foil, and the foil insertion and retention techniques results in a bearing which achieves high load carrying capacity, good damping, low running torque, low starting torque, low lift-off/touch-down speeds, small sway space, low parts count, and low manufacturing cost, all of which are important in the manufacture of high speed turbomachinery.

It is therefore a principal object of the present invention to provide an improved compliant foil hydrodynamic fluid film radial bearing.

It is another object of the present invention to provide such bearing with enhanced load capacity.

It is another object of the present invention to provide such bearing with vary low starting torque.

It is another object of the present invention to provide such bearing with extremely low lift-off and extremely low touch-down speeds.

It is another object of the present invention to provide such bearing with reduced operating torque and operating power consumption.

It is another object of the present invention to provide such bearing with a small sway space, i.e. tight compliance, to strongly restrict rotor deflections.

It is another object of the present invention to provide such bearing with the capability to operate in either direction of rotation, although one direction will have greater load capacity.

It is another object of the present invention to provide such bearing with a cartridge whose aperture is contoured in cam shaped lobes to precisely establish converging and diverging fluid dynamic wedge channels.

It is another object of the present invention to provide such bearing with a cartridge whose aperture is contoured with ramps and joggles to precisely establish converging and diverging fluid dynamic wedge channels.

It is another object of the present invention to provide such bearing with a circumferential preload bar in the cartridge aperture which can apply only compressive circumferential stresses to the foil.

It is another object of the present invention to provide such bearing with anti-translation grooves in the cartridge aperture to prevent the foils from walking out of the cartridge aperture.

It is another object of the present invention to provide a bearing with a cartridge whose foil attachment points are formed with wire electrical discharge machine (EDM) technology.

It is another object of the present invention to provide such bearing with a spring that is non-linear in it's spring rate with deflection, and with the length along the formed fluid dynamic wedge channels. Specifically, the radial spring rate increases with rotor deflection due to the gradual decrease in the cantilever beam free length as the cantilever beams are bent around the rotor arc and the tangency point to that arc shifts.

It is another object of the present invention to provide such bearing with a unique, single spring foil.

It is another object of the present invention to provide such bearing with a single fluid foil.

It is another object of the present invention to provide a bearing with foils that are preloaded away from the rotor to minimize the forces applied to the rotor at zero and low speed.

It is another object of the present invention to provide such bearing with foils that are preloaded towards the cartridge to assure stable foil dynamics and tight/predictable foil nesting.

It is another object of the present invention to provide a bearing with circumferential springs at the ends of the fluid foil and at the ends of the spring foil to aid preloading the foils against the cartridge and to aid foil nesting.

It is another object of the present invention to provide a bearing with anti-translation tabs at the ends of the fluid foil and at the ends of the spring foil to prevent the foils from walking axially out of the cartridge.

It is another object of the present invention to provide a bearing with a spring that is formed flat so that bending the foil to fit into the cartridge causes cantilever beams to stand erect and act as springs.

It is another object of the present invention to provide a bearing with a spring foil that is formed by chemical etch techniques so as to produce cantilever beams that stand erect and function as springs in operation, when the foil is bent or formed and inserted into the cartridge.

It is another object of the present invention to provide a bearing with a spring that produces coulomb damping due to the scuffing action of the cantilever beam ends against the cartridge aperture.

It is another object of the present invention to provide a bearing with a fluid foil having tapered width V-shaped channels chemically etched 50% to 70% into the surface away from the rotor near the ends of the foil in order to taper the foil's bending stiffness and assure that the foil follows the contour of the cartridge aperture.

It is another object of the present invention to provide a bearing with a vented fluid foil.

It is another object of the present invention to provide a bearing with a fluid foil having reduced bending stiffness at the start of the converging channel to assure that the foils conform in shape to the contoured cartridge aperture.

It is another object of the present invention to provide a bearing with foils that have joggles formed by pressing with a tool to form converging ramps and diverging (joggle) slopes which are aligned with ramps and joggles formed in the aperture of the cartridge.

It is another object of the present invention to make a bearing with only two foils that can be bent or formed from a flat condition and installed in the cartridge quickly and easily.

It is another object of the present invention to make a bearing with only one flat spring foil that can be easily bent or formed from a flat condition and installed in the cartridge quickly and easily and one cylindrical fluid foil that can slip into the cartridge quickly and easily.

BRIEF DESCRIPTION OF THE DRAWINGS

FIG. 1 is an exploded, perspective, schematic view of the one bearing of the invention;

FIG. 1B is an enlarged view of the circumferential preload bar and anti-translation groove area of the cartridge shown in FIG. 1;

FIG. 3 is a plan view of the spring foil illustrated in FIG. 1 that provides cantilever beam erected heights and cantilever beam spring rates that vary along the length of the foil;

FIG. 4 is an enlarged, partial view of the spring foil shown in FIG. 3 depicting in detail the cantilever beam structure for one of the three ramp segments;

FIG. 6 is a top, plan view of a fluid foil for the bearing of FIG. 1;

FIG. 7 is a bottom, plan view of the fluid foil depicted in FIG. 6;

FIG. 8 is a partial, enlarged view of the fluid foil shown in FIG. 7 depicting in detail the tapered width V-shaped etch pattern on that side of the foil away from the rotor which causes the foil bending stiffness to vary along the length of the foil;

FIG. 9 is a top, plan view of a fluid foil for use in the FIG. 1 bearing having an alternate, circumferential preload spring at the ends of the foil;

FIG. 10 is a bottom view of the fluid foil of FIG. 9 having the alternate, circumferential preload spring at the ends of the foil;

FIG. 15 is a plan, perspective view of a fluid sleeve for the another embodiment of the bearing of the invention.

DESCRIPTION OF THE PREFERRED EMBODIMENTS

Figure 1A:
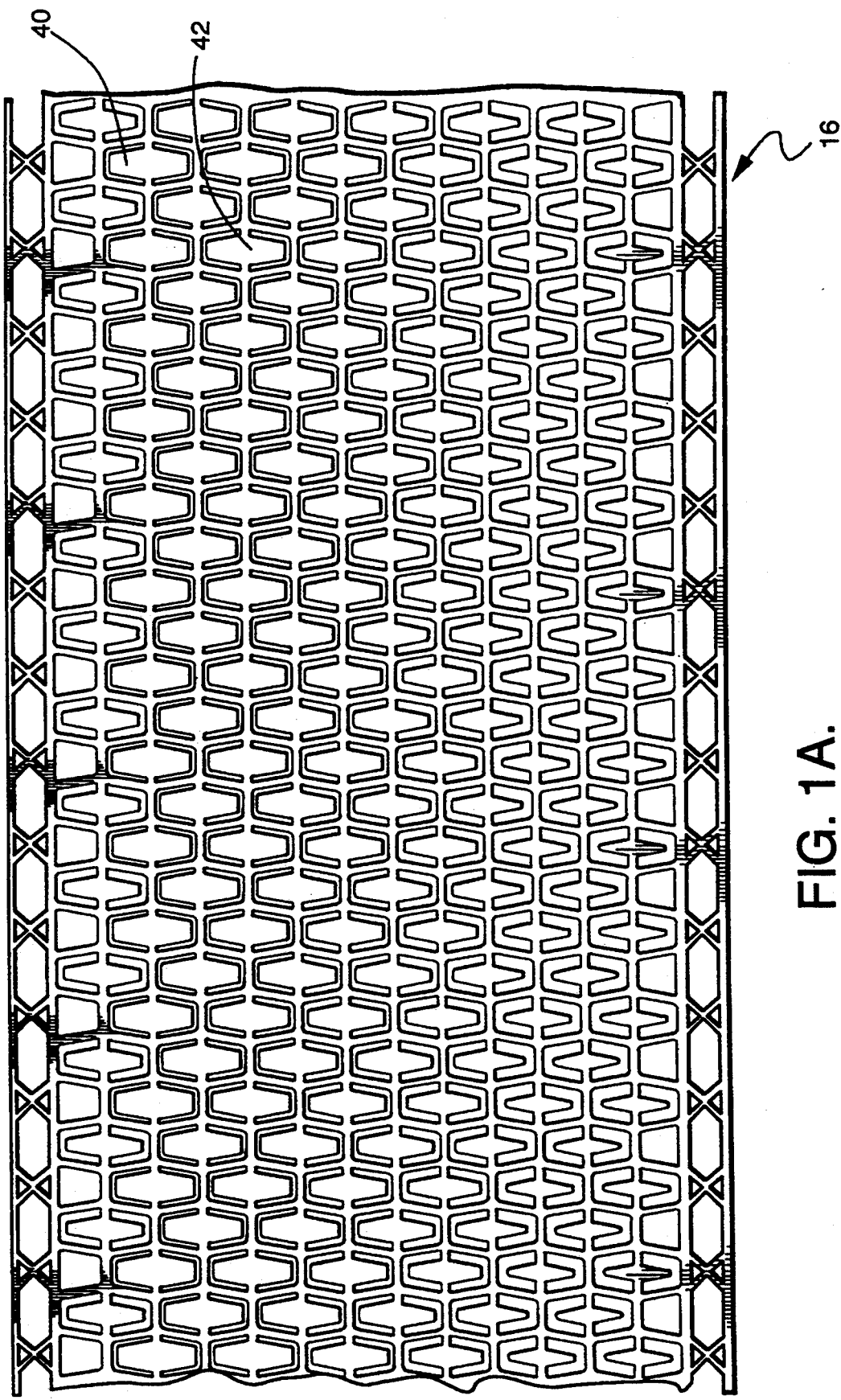
FIG. 1A is an enlarged view of a portion of the spring foil shown in FIG. 1, showing the cantilever beam pattern thereof.

Several modes for carrying out the invention are presented. The FIG. 1 embodiment is the preferred one. Each embodiment is comprised of three major elements in addition to the cylindrical rotor: (1) cartridge, (2) spring foil(s), (3) fluid foil(s). All embodiments utilize cartridges which have contoured rather than round apertures. All embodiments utilize spring foils which are formed as flat sheets and have chemically etched cantilever beams that stand erect when the spring is bent or formed for insertion into the cartridge.

In brief, the preferred embodiment comprises the following elements: (1) cartridge having a contoured aperture with multiple, semi-sinusoidal cam shaped lobes and having a circumferential preload bar; (2) single spring foil with cantilever beams that stand erect when the foil is bent or formed for insertion into the cartridge; and (3) single fluid foil with provision for circumferential preloading when installed in the cartridge.

The preferred embodiment, as shown in FIGS. 1 through 10, comprises cartridge housing 12, spring foil 16, fluid foil 18, and rotor 20. The cartridge housing 12 has aperture or bore 14 that is contoured in the form of spaced, cam-shaped lobes 22 that cause the spring foil 16 and the fluid foil 18 to form spaced, converging fluid wedge channels 24 and diverging fluid wedge channels 26 when these foils are preloaded against cartridge housing contoured aperture 14. Cartridge housing 12 has an anti-rotation pin hole 11 for receiving a pin, not shown, for restraining rotation of the cartridge 12 within a cartridge retainer, also not shown, and has a circumferential preload bar 32 that extends axially the entire length of cartridge housing 12 and applies circumferentially compressive forces in the fluid foil 18 and spring foil 16 to preload these foils against the cartridge housing 12's aperture 14. Spring foil 16 and/or fluid foil 18 can alternately have circumferential preload springs 50, formed as part of the foil, at the ends thereof to press against the circumferential preload bar 32 in order to induce foils 16 and 18 to follow the cartridge housing 12 contoured aperture 14 more compliantly. Fluid foil 18 has tapered width V-shaped channels 46 etched into its outer surface (away from the rotor) extending from near the ends of the foil 18 to about the one-quarter point to gradually reduce its bending spring rate in a diminishing fashion towards the opposed foil 18 ends. This contouring of foil 18 bending spring rate compensates for not being able to apply a bending moment to the ends of the foil 18 when utilizing the bending stresses induced therein when it is inserted into cartridge housing 12 to preload foil 18 against cartridge housing 12's aperture 14.

The spring foil 16 is formed flat by well-known chemical etch techniques. The etch pattern is used to create spaced, cantilever beams 40 that stand erect relative to the cartridge housing 12 aperture 14 when the foil 16 is bent or formed to install into the cartridge housing 12. Cartridge housing 12 has spaced, axial vent, grooves 36 that-direct the bearing's working fluid to spaced vent slots 44 in fluid foil 18 which grooves 36 are located near the end of diverging fluid wedge channels 26 to provide make up fluid such as air, for example. The vent grooves 36 also function to produce local reductions in the fluid foil 18 bending stiffness where the foil 18 bending radius must be smallest to assure that the foil shape complies with the contoured cartridge housing 12 aperture 14. Cartridge housing 12 has two anti-translation grooves 34 that receive anti-translation tabs 48 and 49 formed on each of foil ends 16 and 18, respectively. These anti-translation grooves 34 and tabs 48 and 49 establish the axial location of the foils 16 and 18 in cartridge housing 12. The cartridge housing 12, spring foil 16 and fluid foil 18 are captured and restrained from axial movement at their ends by the cartridge holder and/or washer(s) located at their ends, not shown. Once formed, the erected cantilever beams 40 function as springs and support the fluid foil 18 and rotor 20. The cantilever beams 40 can have erect heights and/or spring rates that vary along the length of converging fluid wedge channels 24.

FIG. 1, which shows an exploded, perspective, schematic view of the preferred embodiment, illustrates how fluid foil 18 and spring foil 16 are formed or bent prior to insertion into the cartridge housing aperture 14 and how fluid foil 18 is installed inside of spring foil 16 and both foils installed inside cartridge housing aperture 14. The angular orientation of foils 16 and 18 within cartridge housing 12 is shown including how anti-translation tabs 48-and 49 are aligned with anti-translation grooves 34 and how vent slots 44, row orientated, in fluid foil 18 are aligned with vent grooves 36 in cartridge housing 12. It should be noted that while spring pattern 42 of spring foil 16 as a whole, is bent or formed to a radius that nominally matches that of housing aperture 14 at the time of installation, the cantilever beams 40 are not markedly bent until rotor 20 and fluid foil 18 are pressed by radial bearing loads against the cantilever beams 40.

FIG. 1A shows an enlarged view of the cantilever beam spring pattern 42 and the plurality of cantilever beams 40.

FIG. 1B shows an enlarged view of the circumferential preload bar 32 and the anti-translation groove 34 located at each end of the bar. It should be noted that circumferential preload bar 32 extends the entire length of the cartridge housing 12 and has an anti-translation groove 34 at each end thereof.

Figure 1C:
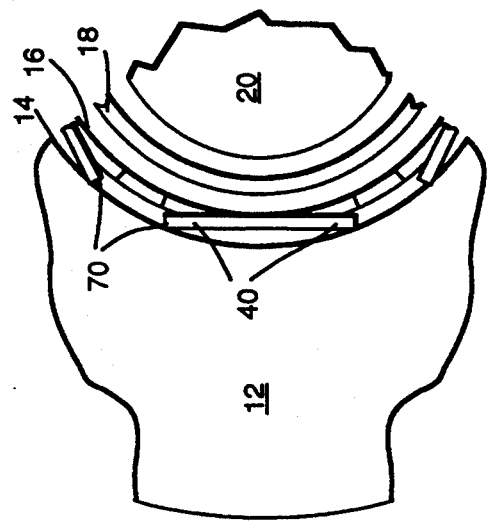
FIG. 1C is an enlarged end view of an arc segment of the assembly of the rotor, fluid foil, spring foil, and cartridge shown in FIG. 1.

FIG. 1C is an end view of the FIG. 1 embodiment showing how the rotor 20, fluid foil 18, spring foil 16 and cartridge housing 12 are assembled together. Note that the cantilever beam tips 70 press against the interior contour of cartridge housing 12 aperture 14 and must slide, producing coulomb damping, if the foil 16 deflects.

Figure 2:
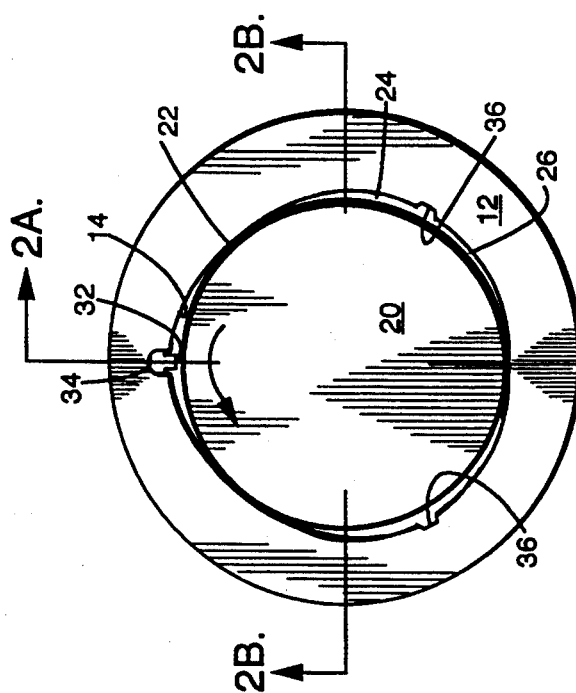
FIG. 2 is an end view of a cartridge aperture, circumferential preload bar, anti-translation groove, axial vent slots and rotor (foils not shown) of the bearing illustrated in FIG. 1.
Figure 2A:
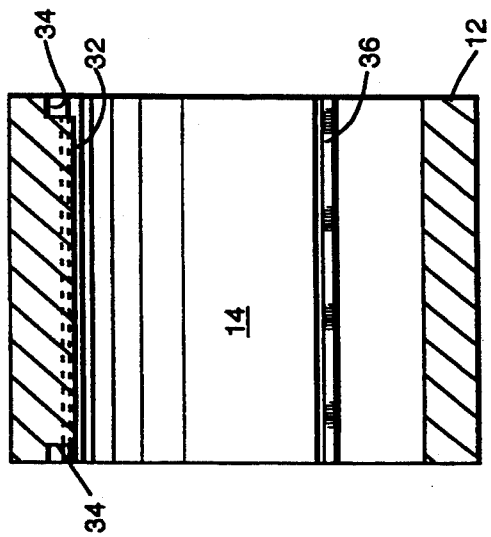
FIG. 2A is a view taken along the line 2A—2A of FIG. 2 with the rotor and foils removed for purposes of clarity.
Figure 2B:
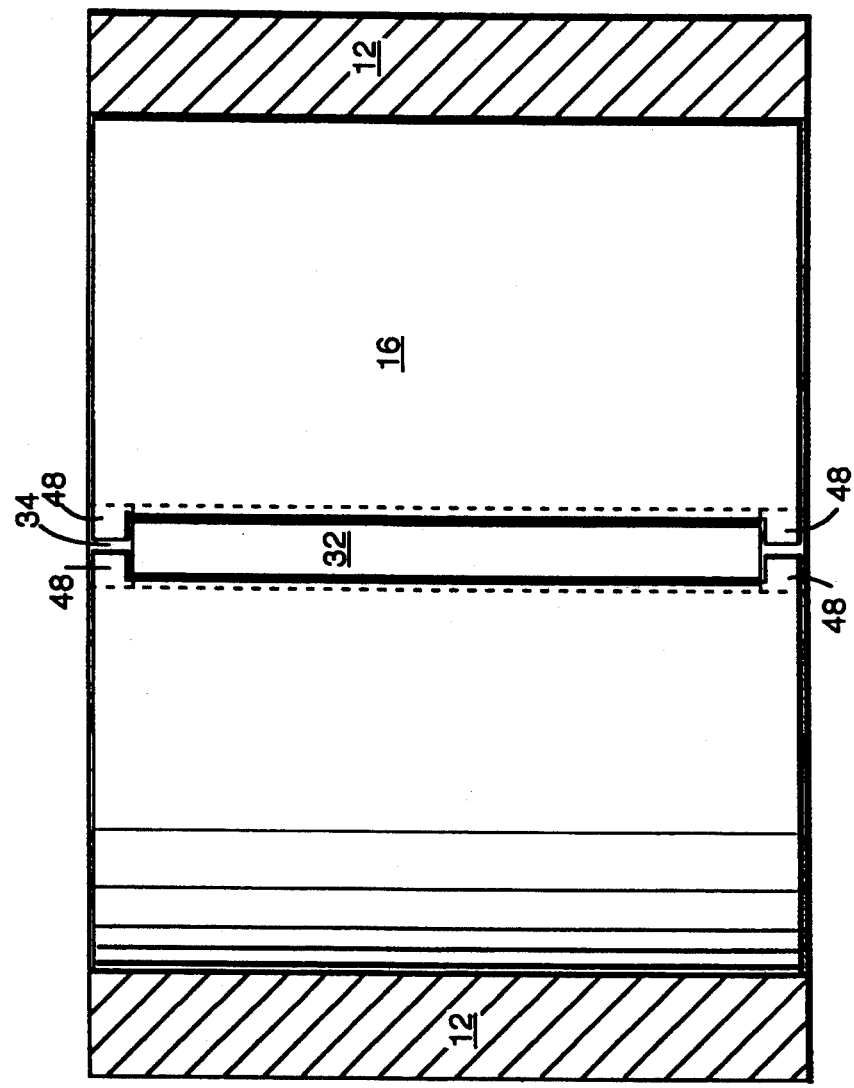
FIG. 2B is a schematic view from the inside of the cartridge aperture showing the circumferential preload bar and anti-translation grooves taken along the line 2B—2B of FIG. 2, with the rotor removed but the foils being shown.

FIGS. 2, 2A and 2B show the details of circumferential preload bar 32, anti-translation groove 34, vent grooves 36 and the location of converging fluid wedge channels 24 and diverging fluid wedge channels 26 relative to cam-shaped lobes 22 making up housing aperture 14. Rotor 20's direction of rotation is indicated by the arrow.

FIG. 3 shows the details of the spring foil 16 for the FIG. 1 embodiment and more specifically the cantilever beam spring pattern 42. The design details that implement the variations of spring erected height (i.e. maximum spring stroke) and spring rate along the length of the converging fluid wedge channel 24 as well as the variation in cantilever beam 40 spring rate with deflection can be seen. Erected height varies approximately with the cantilever beam 40's length squared. Cantilever beam 40 spring rate when undeflected varies approximately with the inverse of beam length cubed and with the beam width to the first power. The spring rate increases with beam deflection owing to the decrease in cantilever beam free length that results when the beam is bent around the rotor 20's radius and the built-in tangency point to that radius shifts. Details of the anti-translation tab 48 are also illustrated.

FIG. 4 is an expanded, partial view of spring foil 16 for the FIG. 1 embodiment showing the details of the cantilever spring pattern 42 in general and the cantilever beams 42 in particular. The segment of the foil shown corresponds to one converging fluid wedge channel 24. A section of the cantilever beam spring pattern corresponding to one back-to-back cantilever beam pair is identified for enlarged viewing in FIGS. 4A and 4B. It should be noted that the spring foil support web tie 72 has bending stiffness that is less than that for the support web structure 66 so that bending or forming the spring foil 16 to insert into cartridge housing 12 aperture 14 will produce a smaller bent/formed radius thereat.

Figure 4A:
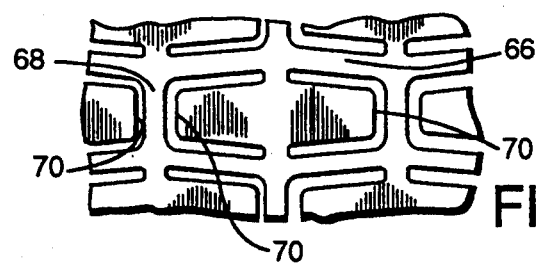
FIG. 4A is a top view of one back-to-back cantilever beam pair.
Figure 4B:
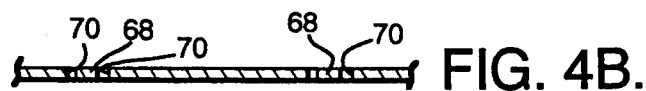
FIG. 4B is a sidle view of one back-to-back cantilever beam pair.

FIGS. 4A and 4B show how the cantilever support web structure 66 connects the cantilever strong backs 68 and identifies the cantilever beam tips 70 whose micro scuffing in the housing cartridge aperture 14 provides coulomb damping. It should be noted that the support web structure 66 is the segment of spring foil 16 that is bent or formed for insertion into cartridge housing aperture 14.

Figure 4C:
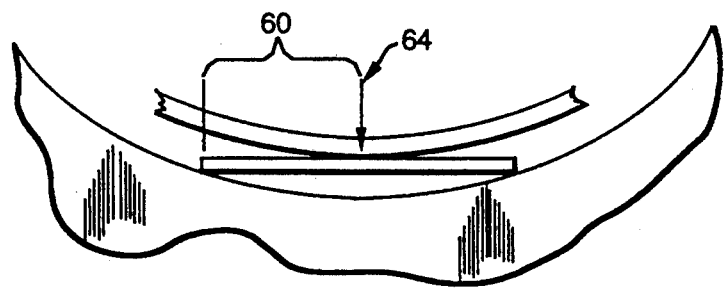
FIGS. 4C, 4D and 4E show how the free length and spring rate of the cantilever beam pairs vary with deflection.
Figure 4D:
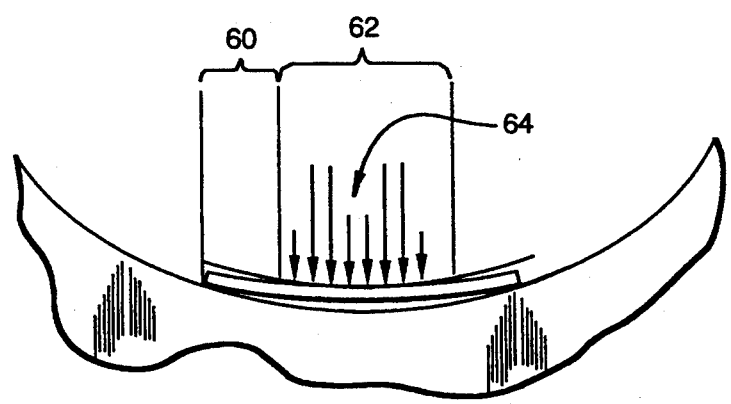
Figure 4E:
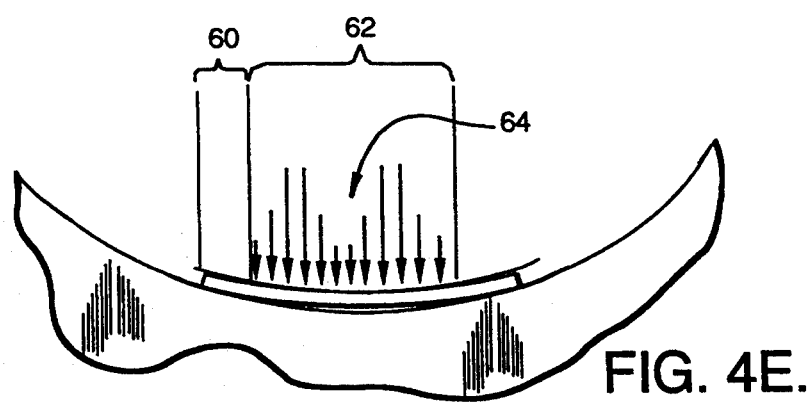

FIGS. 4C, 4D and 4E show how the cantilever loading force pattern 64 changes and widens in shape as the radial force applied to the bearing foils by rotor 20 increases; how cantilever beam 40 wraps around the radius of rotor 20 over a cantilever beam built-in arc length 62 that increases with force level; how the cantilever beam free length 60 decreases with increasing force level; and how the cantilever beam spring rate increases with decreasing free length, increasing force, and increasing cantilever beam inflection. The pattern of slots for spring foil 16, making up the cantilever beams 42, are formed by known chemical etching techniques. FIG. 4C depicts a negligible bending of the cantilever beam 40 when a minute, radial bearing force is applied as represented by the single arrow. FIG. 4D shows a moderate degree of cantilever beam bending when a medium radial bearing force is applied. FIG. 4E shows a large degree of cantilever beam bending when a large radial bearing force is applied.

Figure 5:
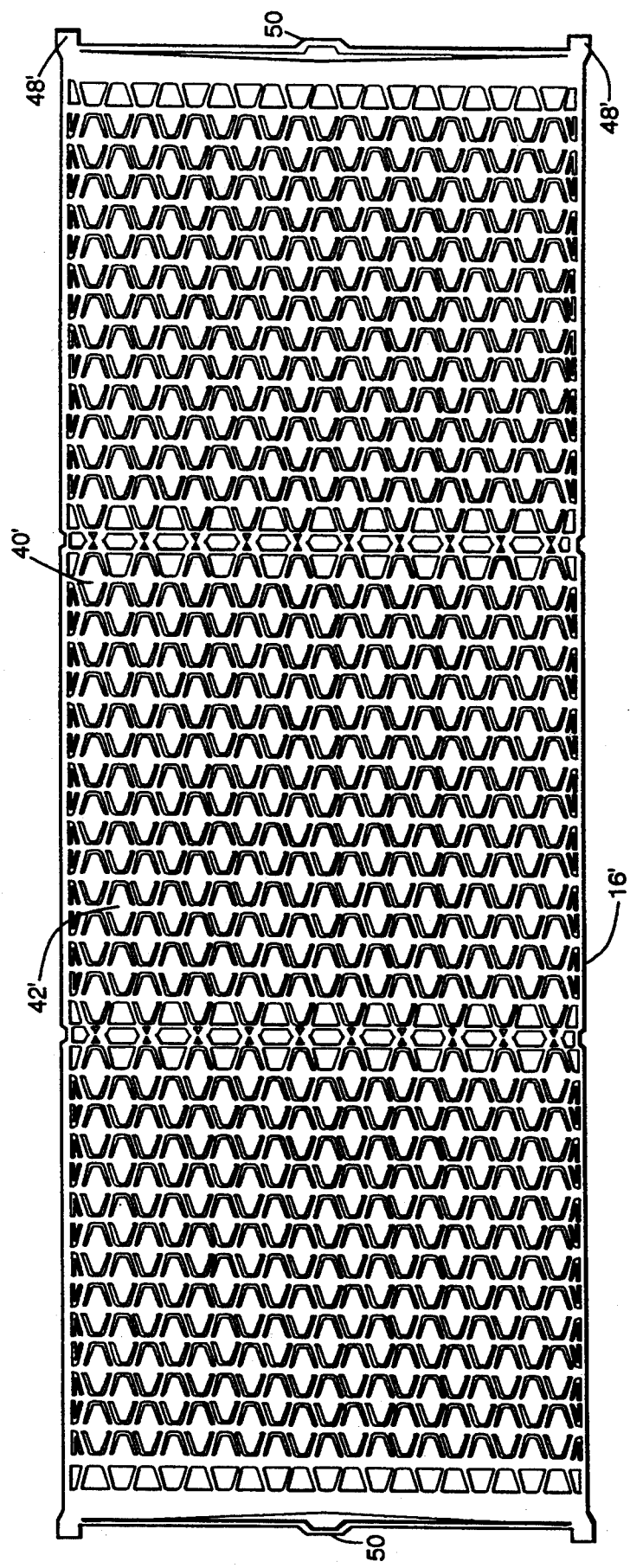
FIG. 5 is a plan view of an alternate spring foil for use in the FIG. 1 bearing having cantilever beam erected heights and cantilever beam spring rates that do not vary along the length of the foil and having circumferential preload springs at the opposed ends of the foil.

FIG. 5 shows an alternate spring foil 16' configuration that utilizes a circumferential preload spring 50 at each end of the foil. The prime numbers designate like elements as already described. The foil 16' shown does not exhibit variations in cantilever beam 40' erect height or spring rates along the length of the foil.

FIG. 6 shows the top view (towards the rotor) of the fluid foil 18 for the FIG. 1 embodiment. Anti-translation tabs 49 are formed as part of the foil 18, in opposed relationship for reasons already discussed. Vent slots 44 are spaced as shown.

FIG. 7 shows the bottom view (away from the rotor) of the fluid foil 18 for the FIG. 1 embodiment. The tapered width V-shaped etch pattern that tailors the foil 18's bending spring rate is shown.

Figure 8A:
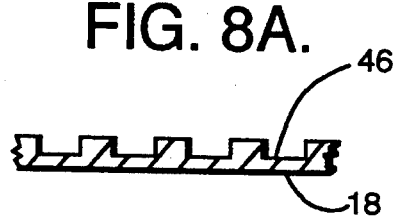
FIGS. 8A, 8B and 8C are end views of the tapered width V-shaped channels in the fluid foil as seen at three cross-section locations.
Figure 8B:
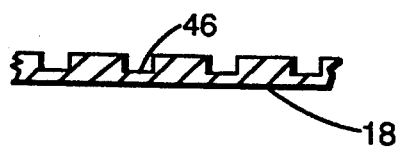
Figure 8C:
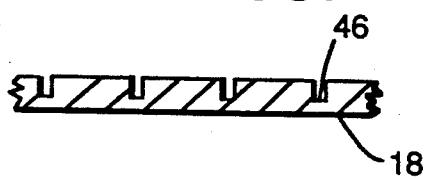

FIG. 8 is an enlarged, partial view of one end of the fluid foil 18 for the FIG. 1 embodiment. The spaced, tapered width V-shaped channels 46 are shown. FIGS. 8A, 8B and 8C show the end views of three sections through the V-shaped channels indicating how the width of the channels and thus foil bending stiffness vary along the foil 18's length.

FIG. 9 shows the top view of an alternate fluid foil 18' for the FIG. 1 embodiment that utilizes circumferential preload springs 50' at the opposed ends of the foil, with the prime numbers designating like elements as previously denoted and described.

FIG. 10 shows the bottom view of the alternate fluid foil 18' for the embodiment that utilizes circumferential preload springs 50' at the ends of the foil 18'.

There will now be described another, alternative or second embodiment of the invention. The elements of this embodiment comprise:

1. Cartridge having a contoured aperture with multiple converging ramps and diverging joggles and having a circumferential preload bar.
2. Single spring foil with cantilever beams that stand erect when the foil is bent for insertion into the cartridge and having formed ramps and joggles which coincide with the converging ramps and diverging joggles in the cartridge aperture.
3. Single fluid foil with provision for circumferential preloading when installed in the cartridge and having formed ramps and joggles which coincide with the converging ramps and diverging joggles in the cartridge aperture.

Figure 11:
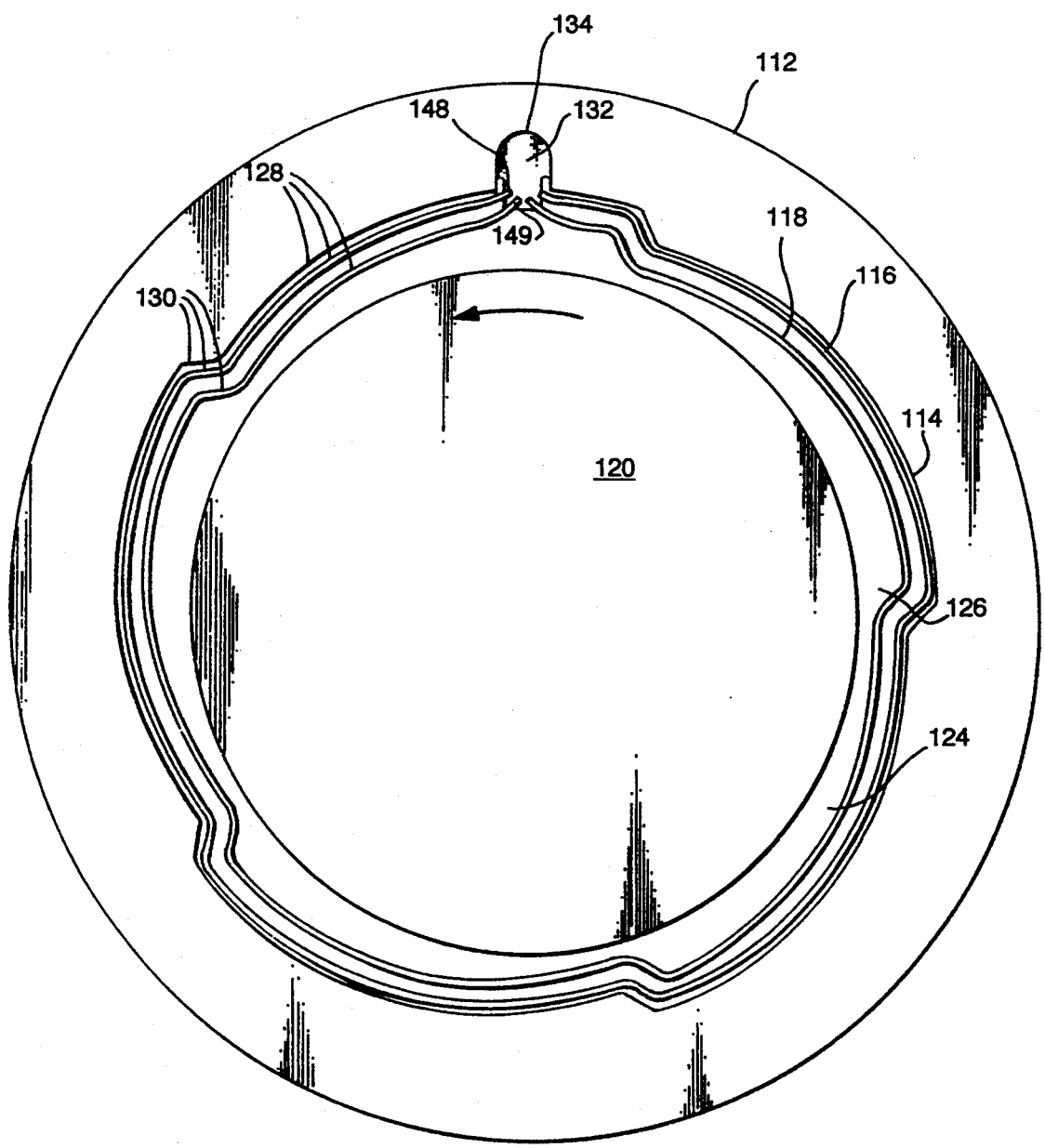
FIG. 11 is an end view of the cartridge aperture, circumferential preload bar, anti-translation groove, spring and fluid dynamic foils and the rotor for an alternate embodiment of the bearing of the invention.

FIG. 11 shows an end view of the second embodiment including cartridge housing 112, aperture 114, spring foil 116, fluid foil 118, rotor 120, ramps 128, joggles 130, converging fluid wedge channels 124 and diverging fluid wedge channels 126. The ramps and joggles are shown in their relative positions in the cartridge aperture 114, spring foil 116 and fluid foil 1218. The overlap of the anti-translation tabs 148 into the anti-translation groove 134 and the circumferential contact of the foil ends with the circumferential preload bar 132 are shown. The direction of rotation of rotor 120 is shown by the arrow.

Another, alternate form or third embodiment of the invention comprises the following elements:

1. Cartridge having a contoured aperture with multiple converging ramps and diverging joggles and having foil attachment slots machined into its bore by electro discharge machine (EDM) technology.
2. Multiple spring foils with cantilever beams that stand erect when the foils are bent for insertion into the cartridge and which are attached to the cartridge by being bent into EDM slots.
3. Multiple fluid foils which are attached to the cartridge by being bent into EDM slots.

Figure 12:
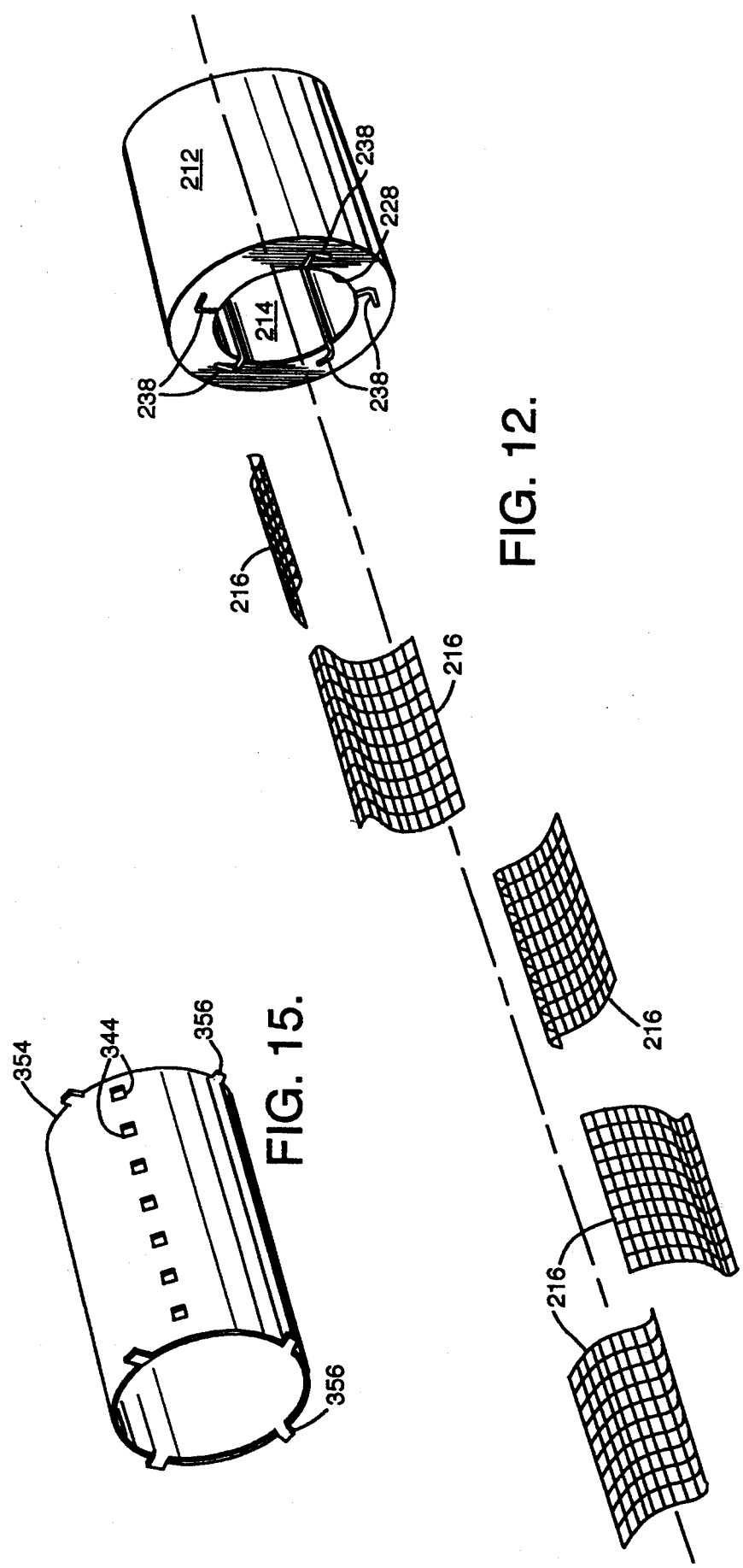
FIG. 12 is an exploded, perspective view of still another embodiment of the bearing of the invention.
Figure 13:
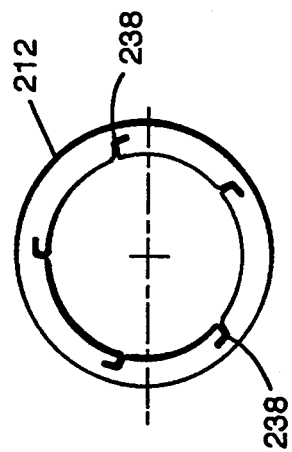
FIGS. 13, 13A, and 13B show partial, orthogonal views of the cartridge for the FIG. 12 embodiment of the invention.
Figure 13B:
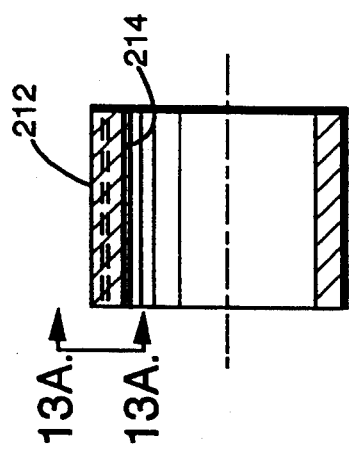
Figure 13A:
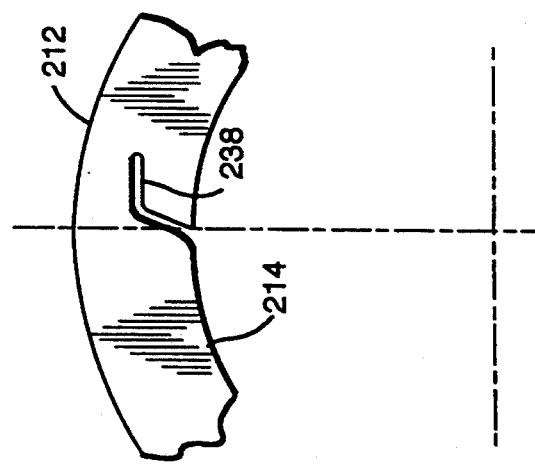
Figure 14:
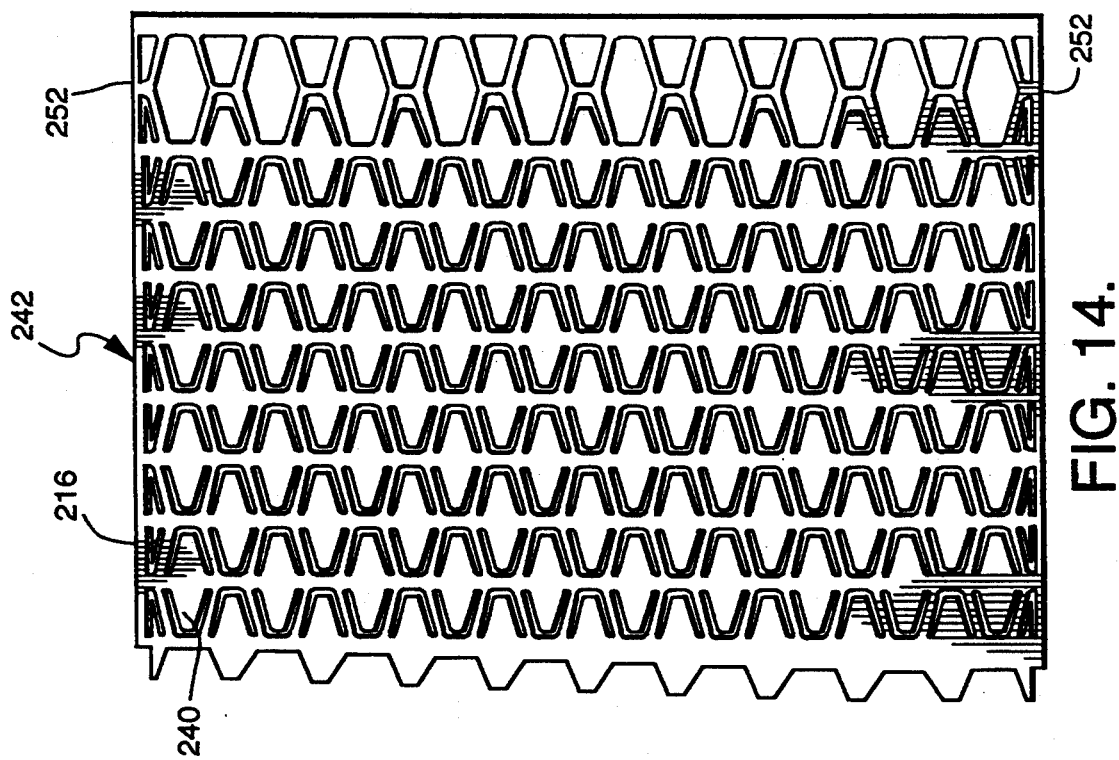
FIG. 14 is a top, plan view of a spring foil for use in the FIG. 12 embodiment of the invention.

This third embodiment is illustrated in FIGS. 12 through 14, inclusive.

FIG. 12 shows an exploded isometric view of the third embodiment depicting the cartridge housing 212, aperture 214, ramps 228, foil attachment slots 238, and five spring foil segments 216. The five other fluid foil segments are not shown, but it should be understood that they are of congruent shape to spring foil segments 216. Each of the segments 216 is provided with cantilever beams, not shown. Each of the five curved segments 216, it will be noted, do not overlap each other.

FIG. 13 shows orthogonal views of the cartridge housing 212 for this third embodiment. Details of the EDM formed foil attachment slots 238 are also shown.

FIG. 14 is a top view of the spring foil 216 for this third embodiment. The cantilever beams 240 within the cantilever beam spring pattern 242 as well as the bend line 252 where the foil enters the EDM formed foil attachment slots are also shown.

Still another embodiment comprises the following elements:

1. Cartridge having a contoured aperture with either cam shaped lobes or converging ramps and diverging joggles and having either a circumferential preload bar or FDM slots to attach the spring foil(s) and having anti-rotation grooves to attach the fluid sleeve.
2. Single or multiple spring foils with cantilever beams that stand erect when the spring is bent for insertion into the cartridge.
3. Continuous cylindrical fluid sleeve that conforms to the cartridge aperture's cam shaped lobes or alternately conforms to the cartridge aperture's ramps and joggles and having anti-rotation tabs for attachment to the cartridge.

This fourth embodiment is illustrated in FIG. 15. The fluid sleeve 354 that functions as a fluid foil is shown. Also shown are vent slots 344 and anti-rotation tabs 356 which are bent to fit into anti-rotation groove at the ends of the cartridge housing, not shown. The fluid sleeve 354 can assume the contours of a cam shaped cartridge aperture into which it is inserted or it can have circumferential ramps and joggles formed in its surface if it is used in conjunction with a ramped and joggled cartridge aperture.

In each of the foregoing embodiments, the foils may be fabricated of a nickel steel of about 0.004 inch thickness such as, for example, INCONEL 750X. The fluid foil is typically annealed whereas the spring foil is heat treated to full hardness in a vacuum oven at 1300° F. for about 20 hours.

The fluid foil may be coated with any of a myriad of known coatings, such as a low friction coating material, as those in the art will know, which reduces starting torque, protects the metal on the foil from abrasion during inadvertent and occasionally high speed touchdowns, and also allows for embedment of contamination particles.

Using the aforedescribed elements, a bearing was fabricated and operated and the parameters thereof are set forth in Example 1.

EXAMPLE 1

The bearing had a rotor diameter of 1.25", a cartridge length of 1.25" and was able to support 27 pounds of non-rotating radial load when the rotor rotated at 19,000 RPM. The bearing also operated from zero to 96,000 RPM with no asynchronous instability. The bearing drag co-efficient was approximately 0.25% as defined by surface sheer force divided by radial bearing load (e.g., both in pounds). The lift-off speed of the rotor was approximately 2000 r.p.m., which is much less than would be expected, inasmuch as the industry standard is about 17,000 r.p.m.

TYPICAL CARTRIDGE HOUSING APERTURE CONTOUR FOR PREFERRED EMBODIMENT

The following table defines the contour of a typical cartridge housing aperture for a 1.25 inch diameter rotor in terms of the radial gap between the contour and the rotor's outer surface in thousandths of an inch. It should be understood that the rotor is perfectly centered within the aperture and no fluid or spring foils are present. The radial gap is given as a function of angular orientation in degrees relative to the center of the circumferential preload bar with angle increasing in the direction of rotor rotation.

The width of the circumferential preload bar is disregarded in this table inasmuch as it locally affects the radial gap. The contour defined is for a three lobed cam shaped cartridge aperture. The radial gaps are the same for the last 60 degrees of arc length for the three converging wedge channels. The radial gaps are the same for the first 30 degrees of arc length for two of the three converging wedge channels and for the entire 30 degrees of arc length for two of the three diverging wedge channels. The first 30 degrees of arc length for one converging wedge channel and the entire 30 degrees of arc length for one diverging wedge channels are of a unique pattern not duplicated at any other angle in the aperture since these contour segments are within 30 degrees of arc of the circumferential preload bar and must allow for reduced foil bending radii near the foil ends.

At the angular orientations where the ends of the diverging wedge channels meet the beginnings of the converging wedge channels, the fluid foil and spring foil must have sufficient radial gap relative to the rotor to assure that they can be axially captured by an end closing washer and/or cartridge retainer (not shown in the drawing) which extends inward at the end of the cartridge to within approximately five thousandth of an inch of the rotor.

The large radial gap at this location also is needed to assure adequate re-entry of make-up fluid to compensate for fluid loss at the sides of the bearing near the trailing ends of the converging wedge. The large radial gap at this location also is useful to provide an axial flow path for process fluid used to cool the foils and rotor. At this location, the bending stiffness of both the fluid foil and the spring foil have been reduced by design to assure a natural tendency for them to bend with a tighter radius and thus produce the desired increase in radial gap.

The aperture contour must be limited in its angular rate of change of curvature so as to avoid any tendency for the foils to bridge rather than continuously follow and touch all arc segments of the cartridge aperture.

TABLE 1

| ANGLES (1, 2 and/or 3) | | | RADIAL GAP (thousandths of an inch) |
|---|---|---|---|
| 000 | | | 41.580000 |
| 001 | | | 38.781004 |
| 002 | | | 36.192181 |
| 003 | | | 33.804340 |
| 004 | | | 31.608373 |
| 005 | | | 29.595253 |
| 006 | | | 27.756042 |
| 007 | | | 26.081890 |
| 008 | | | 24.564039 |
| 009 | | | 23.193825 |
| 010 | | | 21.962683 |
| 011 | | | 20.862149 |
| 012 | | | 19.883864 |
| 013 | | | 19.019578 |
| 014 | | | 18.261156 |
| 015 | | | 17.600581 |
| 016 | | | 17.029961 |
| 017 | | | 16.541535 |
| 018 | | | 16.127676 |
| 019 | | | 15.780909 |
| 020 | | | 15.493907 |
| 021 | | | 15.259511 |
| 022 | | | 15.070741 |
| 023 | | | 14.920805 |
| 024 | | | 14.803123 |
| 025 | | | 14.711347 |
| 026 | | | 14.639390 |
| 027 | | | 14.581464 |
| 028 | | | 14.532140 |
| 029 | | | 14.486435 |
| 030 | 150 | 270 | 14.440000 |
| 031 | 151 | 271 | 14.392400 |
| 032 | 152 | 272 | 14.345600 |
| 033 | 153 | 273 | 14.299600 |
| 034 | 154 | 274 | 14.254400 |
| 035 | 155 | 275 | 14.210000 |
| 036 | 156 | 276 | 14.166400 |
| 037 | 157 | 277 | 14.123600 |
| 038 | 158 | 278 | 14.081600 |
| 039 | 159 | 279 | 14.040400 |
| 040 | 160 | 280 | 14.000000 |
| 041 | 161 | 281 | 13.960400 |
| 042 | 162 | 282 | 13.921600 |
| 043 | 163 | 283 | 13.883600 |
| 044 | 164 | 284 | 13.846400 |
| 045 | 165 | 285 | 13.810000 |
| 046 | 166 | 286 | 13.774400 |
| 047 | 167 | 287 | 13.739600 |
| 048 | 168 | 288 | 13.705600 |
| 049 | 169 | 289 | 13.672400 |
| 050 | 170 | 290 | 13.640000 |
| 051 | 171 | 291 | 13.608400 |
| 052 | 172 | 292 | 13.577600 |
| 053 | 173 | 293 | 13.547600 |
| 054 | 174 | 294 | 13.518400 |
| 055 | 175 | 295 | 13.490000 |
| 056 | 176 | 296 | 13.462400 |
| 057 | 177 | 297 | 13.435600 |
| 058 | 178 | 298 | 13.409600 |
| 059 | 179 | 299 | 13.384400 |
| 060 | 180 | 300 | 13.360000 |
| 061 | 181 | 301 | 13.336400 |
| 062 | 182 | 302 | 13.313600 |
| 063 | 183 | 303 | 13.291600 |
| 064 | 184 | 304 | 13.270400 |
| 065 | 185 | 305 | 13.250000 |
| 066 | 186 | 306 | 13.230400 |
| 067 | 187 | 307 | 13.211600 |
| 068 | 188 | 308 | 13.193600 |
| 069 | 189 | 309 | 13.176400 |
| 070 | 190 | 310 | 13.160000 |
| 071 | 191 | 311 | 13.144400 |
| 072 | 192 | 312 | 13.129600 |
| 073 | 193 | 313 | 13.115600 |
| 074 | 194 | 314 | 13.102400 |
| 075 | 195 | 315 | 13.090000 |
| 076 | 196 | 316 | 13.078400 |
| 077 | 197 | 317 | 13.067600 |
| 078 | 198 | 318 | 13.057600 |
| 079 | 199 | 319 | 13.048400 |

TABLE 1-continued

| ANGLES (1, 2 and/or 3) | | | RADIAL GAP (thousandths of an inch) |
|---|---|---|---|
| 080 | 200 | 320 | 13.040000 |
| 081 | 201 | 321 | 13.032400 |
| 082 | 202 | 322 | 13.025600 |
| 083 | 203 | 323 | 13.019600 |
| 084 | 204 | 324 | 13.014400 |
| 085 | 205 | 325 | 13.010000 |
| 086 | 206 | 326 | 13.006400 |
| 087 | 207 | 327 | 13.003600 |
| 088 | 208 | 328 | 13.001600 |
| 089 | 209 | 329 | 13.000400 |
| 090 | 210 | | 13.000000 |
| 091 | 211 | | 13.026589 |
| 092 | 212 | | 13.102944 |
| 093 | 213 | | 13.224076 |
| 094 | 214 | | 13.385170 |
| 095 | 215 | | 13.581588 |
| 096 | 216 | | 13.808866 |
| 097 | 217 | | 14.062716 |
| 098 | 218 | | 14.339023 |
| 099 | 219 | | 14.633849 |
| 100 | 220 | | 14.943431 |
| 101 | 221 | | 15.264180 |
| 102 | 222 | | 15.592683 |
| 103 | 223 | | 15.925701 |
| 104 | 224 | | 16.260170 |
| 105 | 225 | | 16.593203 |
| 106 | 226 | | 16.922087 |
| 107 | 227 | | 17.244282 |
| 108 | 228 | | 17.557426 |
| 109 | 229 | | 17.859331 |
| 110 | 230 | | 18.147984 |
| 111 | 231 | | 18.421546 |
| 112 | 232 | | 18.678355 |
| 113 | 233 | | 18.916923 |
| 114 | 234 | | 19.135936 |
| 115 | 235 | | 19.334258 |
| 116 | 236 | | 19.510925 |
| 117 | 237 | | 19.665149 |
| 118 | 238 | | 19.796319 |
| 119 | 239 | | 19.903996 |
| 120 | 240 | | 19.987917 |
| 121 | 241 | | 20.044796 |
| 122 | 242 | | 20.071519 |
| 123 | 243 | | 20.068349 |
| 124 | 244 | | 20.035725 |
| 125 | 245 | | 19.974258 |
| 126 | 246 | | 19.884736 |
| 127 | 247 | | 19.768123 |
| 128 | 248 | | 19.625555 |
| 129 | 249 | | 19.458346 |
| 130 | 250 | | 19.267984 |
| 131 | 251 | | 19.056131 |
| 132 | 252 | | 18.824626 |
| 133 | 253 | | 18.575482 |
| 134 | 254 | | 18.310887 |
| 135 | 255 | | 18.033203 |
| 136 | 256 | | 17.744970 |
| 137 | 257 | | 17.448901 |
| 138 | 258 | | 17.147883 |
| 139 | 259 | | 16.844980 |
| 140 | 260 | | 16.543431 |
| 141 | 261 | | 16.246649 |
| 142 | 262 | | 15.958223 |
| 143 | 263 | | 15.681916 |
| 144 | 264 | | 15.421666 |
| 145 | 265 | | 15.181588 |
| 146 | 266 | | 14.965970 |
| 147 | 267 | | 14.779276 |
| 148 | 268 | | 14.626144 |
| 149 | 269 | | 14.511389 |
| 330 | | | 13.000000 |
| 331 | | | 13.001635 |
| 332 | | | 13.008940 |
| 333 | | | 13.026264 |
| 334 | | | 13.058590 |
| 335 | | | 13.111347 |
| 336 | | | 13.190323 |
| 337 | | | 13.301605 |
| 338 | | | 13.451541 |
| 339 | | | 13.646711 |
| 340 | | | 13.893907 |
| 341 | | | 14.200109 |
| 342 | | | 14.572476 |
| 343 | | | 15.018335 |
| 344 | | | 15.545161 |
| 345 | | | 16.160581 |
| 346 | | | 16.872356 |
| 347 | | | 17.688378 |
| 348 | | | 18.616664 |
| 349 | | | 19.665349 |
| 350 | | | 20.842683 |
| 351 | | | 22.157025 |
| 352 | | | 23.616839 |
| 353 | | | 25.230690 |
| 354 | | | 27.007242 |
| 355 | | | 28.955253 |
| 356 | | | 31.083573 |
| 357 | | | 33.401140 |
| 358 | | | 35.916981 |
| 359 | | | 38.640204 |

METHOD OF BEARING FABRICATION AND ASSEMBLY

The bearing cartridge is typically machined from bar stock in all aspects except its aperture. The finished dimensions of the aperture are typically formed by broaching or wire electrical discharge machining (EDM). The foils are typically formed by chemical etch technology based on photo masks that are computer generated from computer aided design (CAD) drawings. The foils are etched from INCONEL 750x that has been rolled to the final thickness. The spring foils are etched from fully heat treated Inconel that has been held at 1300 degrees Fahrenheit for 20 hours. The fluid foils are etched from annealed Inconel. The etched fluid foil is coated with a low friction coating to reduce starting torque and to avoid damaging the metal foil in the event of inadvertent at speed touchdown. The foils are bent or formed to form a nearly circular arc with a 0.75 inch opening for a 1.25 inch diameter bearing (defined by rotor size) using a three roller bending tool. The foil bending radii are slightly reduced at the intersections of the diverging wedge and converging wedge channels and are gradually reduced to zero near the ends of the foils. The spring foil is bent to insert into the cartridge. The spring foil's anti-translation tabs are bent about 30 degrees into the anti-translation grooves. The fluid foil is bent to insert into the cartridge. The fluid foil's anti-translation tab is bent about 30 degrees into the anti-translation grooves. An anti-rotation pin (not shown in the drawings) is inserted into the cartridge's anti-rotation pin hole. The cartridge assembly (including foils and anti-rotation pin) is installed in the cartridge retainer (not shown in the drawings). The cartridge assembly is thus restrained from rotational and radial translational motion. A washer and snap ring (not shown in the drawings) are installed at the end of the cartridge to hold the assembly and the foils against axial motion. The bearing is now ready to operate. One appeal of the bearing is the ease and speed with which it is assembled, as those of skill in the art will recognize.

TYPICAL OPERATION OF 1.25 INCH DIAMETER BEARING

At zero speed the rotor is in contact with the coated fluid foil. The bearing's starting torque is controlled by the coating friction factor, the rotor radius, the rotor length, the rotating assembly weight carried by the bearing and by the preload forces generated by the spring foil.

It should be noted that this bearing has been designed to have extremely low spring generated preload forces. When the rotor is accelerated, the coated foils experience wear until sufficient speed has been reached for fluid dynamic forces to lift the rotor out of contact with the fluid foil. For a 1.25 inch diameter bearing rotor lift off speed is about 2,000 revolutions per minute. This is an extremely low lift off speed compared to industry standards.

As speed increases up to about 4,000 revolutions per minute, bearing torque decreases due to increasing fluid film thickness. As speed is increased above about 4,000 revolutions per minute, torque gradually increases again. Rotor criticals at about 10,000 RPM have dimensionless damping constants Q (defined as energy stored in resonance divided by energy dissipated per cycle) of approximately 2. Criticals at about 30,000 RPM have Q's of about 6. Coulomb damping increases with increasing runout due to the non-linear nature of the cantilever beam tip scuffing.

Thus, a relatively low-cost, easily and quickly assembled bearing assembly and its mode of operation is readily apparent, for a myriad of applications. While a specific bearing of specific size has been disclosed, the theory and intrinsic elements making up the bearing will readily present themselves to workers in the art for application to various other uses.

The bearing of the disclosed invention may have various modifications and changes, all of which will not detract from the essence of the invention and all of which are intended to be covered by the appended claims.

I claim:

1. A compliant foil hydrodynamic fluid film radial bearing comprising: a cartridge housing defining an aperture having a non-circular, interior contour, a spring foil member disposed within said aperture of said cartridge housing and conforming to said non-circular, interior contour, a fluid foil member disposed within said spring foil member and conforming to the shape of said non-circular interior contour, and a rotor rotatably positioned within said fluid foil member, said spring foil member and said aperture of said cartridge housing wherein, rotation of said rotor generates fluid film forces which support and control the position of said rotor within said non-circular, interior contour of said aperture.

2. The bearing according to claim 1 wherein said aperture of said cartridge is contoured to form cam-shaped lobes which force said spring foil member and said fluid foil member, which spring foil and fluid foil members are preloaded against said aperture of said cartridge, to form alternately converging and diverging fluid wedge channels between said fluid foil member and said rotor.

3. The bearing according to claim 1 wherein said aperture of said cartridge is contoured to form a plurality of converging ramps and diverging joggles which force said spring foil member and said fluid foil member to form like alternately converging and diverging fluid wedge channels between said fluid foil member and said rotor.

4. The bearing according to claim 2 or claim 3 wherein said aperture of said cartridge housing has a plurality of axial vent slots located at the beginning of said converging fluid wedge channels to provide fluid to vent slots in said fluid foil member.

5. The bearing according to claim 2 or claim 3 wherein said spring foil member is an integral single spring foil element and said foil element occupies between 345 and 359 degrees of arc within said aperture of said cartridge housing and wherein said spring foil element is formed flat and wherein bending said spring foil element to fit within said cartridge housing causes a plurality of cantilever beam to stand erect relative to the arced plane of the spring foil element which erect cantilever beams act as springs.

6. The bearing according to claim 5 wherein said spring foil element is formed flat and wherein bending said spring foil element to fit within said cartridge housing causes a plurality of cantilever beams to stand erect relative to the arced plane of the spring foil element which erect cantilever beams act as springs.

7. The bearing according to claim 5 wherein said spring foil element has a non-deflected thickness that increases along the length of said converging fluid wedge channels as the length of said cantilever beams increases along said length.

8. The bearing according to claim 5 wherein said spring foil element has a spring rate that increases along the length of said converging fluid wedge channels as the width of said cantilever beams increases along said length.

9. The bearing according to claim 5 wherein said spring foil element has a non-linear spring rate that increases with deflection as said cantilever beam free length decreases as the cantilever beam bends around the rotor arc and the tangency point to that art shifts.

10. The bearing according to claim 5 wherein said spring foil element achieves coulomb damping due to scuffing motion of said cantilever beam tips against said aperture of said cartridge housing.

11. The bearing according to claim 5 wherein said spring foil element has spaced design elements about one-third the distance from each end thereof to form areas of different spring rates relative to the remainder of said spring foil element.

12. The bearing according to claim 5 wherein said foil members are retained within and forced to follow said non-circular, interior contour of said aperture of said cartridge housing by bending stresses induced when the flat formed foil elements are bent to form nearly circular shapes and are then installed into said cartridge housing, said bending stresses serving as foil to cartridge housing preload forces that assure tight foil nesting to help stabilize foil flutter.

13. The bearing according to claim 5 wherein said foil member is preloaded against said aperture of said cartridge housing by circumferentially compressive forces at one or both ends of said foil member exerted by said cartridge element's circumferential preload bar.

14. The bearing according to claim 5 wherein said spring foil member is a single spring foil element and said fluid foil member is a single fluid foil element and both occupy between 345 and 359 degrees of arc within said cartridge and function together to apply zero to minimal spring preload force on said rotor, thereby minimizing the lift-off/touch-down speed of the bearing and minimizing bearing wear during starting and stopping.

15. The bearing according to claim 2 or claim 3 wherein said fluid foil member is a single element and said fluid foil member occupies between 345 and 359 degrees of arc within said aperture of said cartridge housing.

16. The bearing according to claim 15 wherein joggles are formed into the fluid foil member and/or fluid sleeve element making up said foil member, said joggles constitute the non-rotating walls for the diverging area of the fluid channels and the ramps between joggles constitute the non-rotating walls for the converging area of the fluid wedge channels.

17. The bearing according to claim 15 wherein said fluid foil member is vented in the area of the diverging fluid wedges, whereby said fluid foil member's bending stiffness is locally reduced and said vents permit makeup fluid from the area of said spring foil being drawn by aspiration forces into the area between said fluid foil member and said rotor.

18. The bearing according to claim 15 wherein said fluid foil member has V-shaped channels extending about 50% to 70% deep into said fluid foil surface facing away from said rotor at both ends of said foil element to taper the foil's bending stiffness and thus assure tight nesting of said fluid foil member against said spring foil member to follow said interior contour of said aperture of said cartridge housing.

19. The bearing according to claim 15 wherein said foil member is preloaded against said aperture of said cartridge housing by circumferentially compressive forces at one or both ends of said foil member exerted by said cartridge element's circumferential preload bar.

20. The bearing according to claim 15 wherein said foil members are retained within and forced to follow said non-circular, interior contour of said aperture of said cartridge housing by bending stresses induced when the flat formed foil elements are bent to form nearly circular shapes and are then installed into said cartridge housing, said bending stresses serving as foil to cartridge housing preload forces that assure tight foil nesting to help stabilize foil flutter.

21. The bearing according to claim 15 wherein said fluid foil member is adapted to allow said rotor to rotate in either direction without inducing foil member failure wherein either direction of rotor rotation induces circumferential compressive stresses in said fluid foil member between the location of rotor to foil shear force generation and the location of said fluid foil element's "push only" attachment to said cartridge's circumferential preload bard, wherein only circumferential tensile stresses in said fluid foil can cause it to tighten around said rotor and potentially lead to foil failure.

22. The bearing according to claim 15 wherein said spring foil member is a single spring foil element and said fluid foil member is a single fluid foil element and both occupy between 345 and 359 degrees of arc within said cartridge and function together to apply zero to minimal spring preload force on said rotor, thereby minimizing the lift-off/touch-down speed of the bearing and minimizing bearing wear during starting and stopping.

23. The bearing according to claim 2 or claim 3 wherein said fluid foil member is a single fluid sleeve element which is attached to said cartridge housing by end tabs arrayed around the ends of said fluid sleeve element.

24. The bearing according to claim 23 wherein joggles are formed into the fluid foil member and/or fluid sleeve element making up said foil member, said joggles constitute the non-rotating walls for the diverging area of the fluid channels and the ramps between joggles constitute the non-rotating walls for the converging area of the fluid wedge channels.

25. The bearing according to claim 23 wherein said fluid foil member is vented in the area of the diverging fluid wedges, whereby said fluid foil member's bending stiffness is locally reduced and said vents permit makeup fluid from the area of said spring foil being drawn by aspiration forces into the area between said fluid foil member and said rotor.

26. The bearing according to claim 3 wherein said spring foil member comprises a plurality of spring foil segments that are arrayed around and secured to said aperture of said cartridge housing by an L-shaped bend in each of said foil segments which L-shaped bend is inserted into said foil attachment slots of said cartridge housing and wherein said spring foil element is formed flat and wherein bending said spring foil element to fit within said cartridge housing causes a plurality of cantilever beams to stand erect relative to the arced plane of the spring foil element which erect cantilever beams act as springs.

27. The bearing according to claim 26 wherein said spring foil element is formed flat and wherein bending said spring foil element to fit within said cartridge housing causes a plurality of cantilever beams to stand erect relative to the arced plane of the spring foil element which erect cantilever beams act as springs.

28. The bearing according to claim 26 wherein said spring foil element has a non-deflected thickness that increases along the length of said converging fluid wedge channels as the length of said cantilever beams increases along said length.

29. The bearing according to claim 26 wherein said spring foil element has a spring rate that increases along the length of said converging fluid wedge channels as the width of said cantilever beams increases along said length.

30. The bearing according to claim 26 wherein said spring foil element has a non-linear spring rate that increases with deflection as said cantilever beam free length decreases as the cantilever beam bends around the rotor arc and the tangency point to that arc shifts.

31. The bearing according to claim 26 wherein said spring foil element achieves coulomb damping due to scuffing motion of said cantilever beam tips against said aperture of said cartridge housing.

32. The bearing according to claim 26 wherein said spring foil element has spaced design elements about one-third the distance from each end thereof to form areas of different spring rates relative to the remainder of said spring foil element.

33. The bearing according to claim 3 wherein said aperture of said cartridge housing has narrow foil attachment slots where shaped bends in said spring foil member and said fluid foil member allow said foil members to be fitted into said foil attachment slots and secured against rotation and extraction.

34. The bearing according to claim 3 wherein said fluid foil member comprises a plurality of fluid foil segments that are arrayed around and attached to said aperture of said cartridge housing by a Z- or L-shaped bend in each of said foil segments which bends are inserted into said foil attachment slots of said cartridge housing.

35. The bearing according to claim 3 wherein said spring foil member is a single spring foil element and said fluid foil member is a single fluid foil element and both occupy between 345 and 359 degrees of arc within said cartridge and function together to apply zero to minimal spring preload force on said rotor, thereby minimizing the lift-off/touch-down speed of the bearing and minimizing bearing wear during starting and stopping.

36. The bearing according to claim 1 wherein said aperture of said cartridge housing has a circumferential preload bar extending the length thereof which applies circumferential compressive stresses to the ends of said spring foil member and said fluid foil member in order to preload said spring foil member and said fluid foil member against said aperture of said cartridge housing.

37. The bearing according to claim 36 wherein said spring foil member and said fluid foil member have end tabs and cartridge housing and said circumferential preload bar have an anti-translation groove at each end thereof which captures and retains said end tabs of said spring foil member and said fluid foil member so as to prevent said foil member from moving out of the ends of said aperture of said cartridge housing.

38. The bearing according to claims 36, wherein said foil member is preloaded against said aperture of said cartridge housing by circumferentially compressive forces at one or both ends of said foil member exerted by said cartridge element's circumferential preload bar.

39. The bearing according to claim 36 wherein said fluid foil member is adapted to allow said rotor to rotate in either direction without inducing foil member failure wherein either direction of rotor rotation induces circumferential compressive stresses in said fluid foil member between the location of rotor to foil shear force generation and the location of said fluid foil element's "push only" attachment to said cartridge's circumferential preload bar, wherein only circumferential tensile stresses in said fluid foil can cause it to tighten around said rotor and potentially lead to foil failure.

40. The bearing according to claim 1 wherein said fluid and spring foil members have compressive springs formed in at least one end thereof, said spring urging said fluid and spring foils against each other and forcing said spring foil to follow the non-circular, interior contour of said aperture of said cartridge housing, whereby said compressive springs contribute to tight and predictable nesting of said foils in said cartridge housing, stabilize said foils flutter and assure tight limits on said rotor's deflections.

* * * * *